US007166674B2

(12) United States Patent
Datta et al.

(10) Patent No.: US 7,166,674 B2
(45) Date of Patent: *Jan. 23, 2007

(54) ELASTIC BLENDS COMPRISING CRYSTALLINE POLYMER AND CRYSTALLIZABLE POLYMERS OF PROPYLENE

(75) Inventors: Sudhin Datta, Houston, TX (US); Charles Cozewith, Bellaire, TX (US); Periagaram Ravishankar, Kingwood, TX (US); Edmund J. Stachowski, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/352,559

(22) Filed: Feb. 13, 2006

(65) Prior Publication Data

US 2006/0142496 A1 Jun. 29, 2006

Related U.S. Application Data

(63) Continuation of application No. 10/846,256, filed on May 14, 2004, which is a continuation of application No. 10/613,374, filed on Jul. 3, 2003, now Pat. No. 6,927,258, which is a continuation of application No. 09/342,854, filed on Jun. 29, 1999, now Pat. No. 6,642,316, which is a continuation-in-part of application No. 09/108,467, filed on Jul. 1, 1998, now abandoned.

(51) Int. Cl.
*C08L 23/04* (2006.01)
*C08L 23/10* (2006.01)
*C08K 5/00* (2006.01)
(52) U.S. Cl. .................... 525/191; 525/240; 524/515
(58) Field of Classification Search ................ 525/191, 525/240; 524/515
See application file for complete search history.

(56) References Cited

U.S. PATENT DOCUMENTS

| | | | |
|---|---|---|---|
| 2,957,512 A | 10/1960 | Wade et al. |
| 3,156,242 A | 11/1964 | Crowe, Jr. |
| 3,262,992 A | 7/1966 | Holzer et al. |
| 3,378,606 A | 4/1968 | Kontos |
| 3,485,706 A | 12/1969 | Evans |
| 3,520,861 A | 7/1970 | Thomson et al. |
| 3,758,656 A | 9/1973 | Shih |
| 3,812,077 A | 5/1974 | Hobbs |
| 3,853,969 A | 12/1974 | Kontos |
| 3,881,489 A | 5/1975 | Hartwell |
| 3,882,197 A | 5/1975 | Fritz et al. |
| 3,888,949 A | 6/1975 | Shih |
| 3,989,867 A | 11/1976 | Sisson |
| 3,998,911 A | 12/1976 | Strametz et al. |
| 4,076,698 A | 2/1978 | Anderson et al. |
| 4,211,852 A | 7/1980 | Matsuda et al. |
| 4,322,027 A | 3/1982 | Reba |
| 4,330,646 A | 5/1982 | Sakurai et al. |
| 4,381,781 A | 5/1983 | Sciaraffa et al. |
| 4,411,821 A | 10/1983 | Howard, Jr. |
| 4,413,110 A | 11/1983 | Kavesh et al. |
| 4,425,393 A | 1/1984 | Benedyk et al. |
| 4,430,563 A | 2/1984 | Harrington |
| 4,461,872 A | 7/1984 | Su |
| 4,491,652 A | 1/1985 | Matthews et al. |
| 4,540,753 A | 9/1985 | Cozewith et al. |
| 4,542,199 A | 9/1985 | Kaminsky et al. |
| 4,543,399 A | 9/1985 | Jenkins, III et al. |
| 4,544,762 A | 10/1985 | Kaminsky et al. |
| 4,578,414 A | 3/1986 | Sawyer et al. |
| 4,588,790 A | 5/1986 | Jenkins, III et al. |
| 4,599,392 A | 7/1986 | McKinney et al. |
| 4,612,300 A | 9/1986 | Coleman, III |
| 4,644,045 A | 2/1987 | Fowells |
| 4,663,220 A | 5/1987 | Wisneski et al. |
| 4,668,566 A | 5/1987 | Braun |
| 4,668,753 A | 5/1987 | Kashiwa et al. |
| 4,752,597 A | 6/1988 | Turner |
| 4,758,656 A | 7/1988 | Itoh et al. |
| 4,808,561 A | 2/1989 | Welborn, Jr. |
| 4,830,907 A | 5/1989 | Sawyer et al. |
| 4,842,922 A | 6/1989 | Krupp et al. |
| 4,859,757 A | 8/1989 | Pellon et al. |

(Continued)

FOREIGN PATENT DOCUMENTS

EP 0 037 659 10/1981

(Continued)

OTHER PUBLICATIONS

Carlson et al., "Component Relaxation Processes within Elastomeric Polypropylene," Macromolecules, vol. 32, pp. 8100-8106 (1999).

(Continued)

*Primary Examiner*—Nathan M. Nutter

(57) ABSTRACT

Improved thermoplastic polymer blend compositions comprising an isotactic polypropylene component and an alpha-olefin and propylene copolymer component, said copolymer comprising crystallizable alpha-olefin sequences. In a preferred embodiment, improved thermoplastic polymer blends are provided comprising from about 35% to about 85% isotactic polypropylene and from about 30% to about 70% of an ethylene and propylene copolymer, wherein said copolymer comprises isotactically crystallizable propylene sequences and is predominately propylene. The resultant blends manifest unexpected compatibility characteristics, increased tensile strength, and improved process characteristics, e.g., a single melting point.

40 Claims, 8 Drawing Sheets

U.S. PATENT DOCUMENTS

| | | |
|---|---|---|
| 4,871,705 A | 10/1989 | Hoel |
| 4,874,880 A | 10/1989 | Miya et al. |
| 4,879,170 A | 11/1989 | Radwanski et al. |
| 4,897,455 A | 1/1990 | Welborn, Jr. |
| 4,909,975 A | 3/1990 | Sawyer et al. |
| 4,912,075 A | 3/1990 | Chang |
| 4,937,217 A | 6/1990 | Chang |
| 4,937,301 A | 6/1990 | Chang |
| 4,939,016 A | 7/1990 | Radwanski et al. |
| 4,940,464 A | 7/1990 | Van Gompel et al. |
| 4,960,878 A | 10/1990 | Crapo et al. |
| 4,988,781 A | 1/1991 | McKinney et al. |
| 5,008,228 A | 4/1991 | Chang |
| 5,015,749 A | 5/1991 | Schmidt et al. |
| 5,017,714 A | 5/1991 | Welborn, Jr. |
| 5,028,670 A | 7/1991 | Chinh et al. |
| 5,032,562 A | 7/1991 | Lo et al. |
| 5,037,416 A | 8/1991 | Allen et al. |
| 5,041,583 A | 8/1991 | Sangokoya |
| 5,041,584 A | 8/1991 | Crapo et al. |
| 5,041,585 A | 8/1991 | Deavenport et al. |
| 5,044,438 A | 9/1991 | Young |
| 5,057,475 A | 10/1991 | Canich et al. |
| 5,064,802 A | 11/1991 | Stevens et al. |
| 5,068,141 A | 11/1991 | Kubo et al. |
| 5,085,654 A | 2/1992 | Buell |
| 5,086,025 A | 2/1992 | Chang |
| 5,093,415 A | 3/1992 | Brady, III et al. |
| 5,096,867 A | 3/1992 | Canich |
| 5,106,804 A | 4/1992 | Bailly et al. |
| 5,108,820 A | 4/1992 | Kaneko et al. |
| 5,112,686 A | 5/1992 | Krupp et al. |
| 5,115,027 A | 5/1992 | Ogawa et al. |
| 5,120,867 A | 6/1992 | Welborn, Jr. |
| 5,132,262 A | 7/1992 | Rieger et al. |
| 5,132,380 A | 7/1992 | Stevens et al. |
| 5,134,209 A | 7/1992 | Job et al. |
| 5,147,949 A | 9/1992 | Chang |
| 5,153,157 A | 10/1992 | Hlatky et al. |
| 5,198,401 A | 3/1993 | Turner et al. |
| 5,218,071 A | 6/1993 | Tsutsui et al. |
| 5,229,478 A | 7/1993 | Floyd et al. |
| 5,238,892 A | 8/1993 | Chang |
| 5,243,001 A | 9/1993 | Winter et al. |
| 5,272,236 A | 12/1993 | Lai et al. |
| 5,278,119 A | 1/1994 | Turner et al. |
| 5,278,264 A | 1/1994 | Spaleck et al. |
| 5,278,272 A | 1/1994 | Lai et al. |
| 5,280,074 A | 1/1994 | Schreck et al. |
| 5,296,433 A | 3/1994 | Siedle et al. |
| 5,296,434 A | 3/1994 | Karl et al. |
| 5,304,614 A | 4/1994 | Winter et al. |
| 5,321,106 A | 6/1994 | LaPointe |
| 5,322,728 A | 6/1994 | Davey et al. |
| 5,322,902 A | 6/1994 | Schreck et al. |
| 5,324,800 A | 6/1994 | Welborn, Jr. et al. |
| 5,331,054 A | 7/1994 | Fujita et al. |
| 5,336,552 A | 8/1994 | Strack et al. |
| 5,350,723 A | 9/1994 | Neithamer et al. |
| 5,352,749 A | 10/1994 | DeChellis et al. |
| 5,358,792 A | 10/1994 | Mehta et al. |
| 5,380,810 A | 1/1995 | Lai et al. |
| 5,382,400 A | 1/1995 | Pike et al. |
| 5,384,373 A | 1/1995 | McKinney et al. |
| 5,387,568 A | 2/1995 | Ewen et al. |
| 5,391,629 A | 2/1995 | Turner et al. |
| 5,405,922 A | 4/1995 | DeChellis et al. |
| 5,408,017 A | 4/1995 | Turner et al. |
| 5,412,020 A | 5/1995 | Yamamoto et al. |
| 5,416,178 A | 5/1995 | Winter et al. |
| 5,427,991 A | 6/1995 | Turner |
| 5,436,304 A | 7/1995 | Griffin et al. |
| 5,451,639 A | 9/1995 | Marczinke et al. |
| 5,453,471 A | 9/1995 | Bernier et al. |
| 5,455,305 A | 10/1995 | Galambos |
| 5,461,113 A | 10/1995 | Marczinke et al. |
| 5,461,123 A | 10/1995 | Song et al. |
| 5,462,999 A | 10/1995 | Griffin et al. |
| 5,472,775 A | 12/1995 | Obijeski et al. |
| 5,473,028 A | 12/1995 | Nowlin et al. |
| 5,504,049 A | 4/1996 | Crowther et al. |
| 5,504,172 A | 4/1996 | Imuta et al. |
| 5,516,848 A | 5/1996 | Canich et al. |
| 5,516,866 A | 5/1996 | Resconi et al. |
| 5,539,056 A | 7/1996 | Yang et al. |
| 5,541,270 A | 7/1996 | Chinh et al. |
| 5,556,238 A | 9/1996 | Chinh |
| 5,556,928 A | 9/1996 | Devore et al. |
| 5,576,259 A | 11/1996 | Hasegawa et al. |
| 5,585,448 A | 12/1996 | Resconi et al. |
| 5,594,080 A | 1/1997 | Waymouth et al. |
| 5,599,761 A | 2/1997 | Turner |
| 5,608,019 A | 3/1997 | Cheruvu et al. |
| 5,616,661 A | 4/1997 | Eisinger et al. |
| 5,616,664 A | 4/1997 | Timmers et al. |
| 5,618,895 A | 4/1997 | Kerth et al. |
| 5,621,046 A | 4/1997 | Iwanami et al. |
| 5,621,127 A | 4/1997 | Langhauser et al. |
| 5,625,087 A | 4/1997 | Devore et al. |
| 5,637,660 A | 6/1997 | Nagy et al. |
| 5,641,828 A | 6/1997 | Sadatoshi et al. |
| 5,645,542 A | 7/1997 | Anjur et al. |
| 5,656,374 A | 8/1997 | Marzola et al. |
| 5,685,128 A | 11/1997 | Chum et al. |
| 5,686,533 A | 11/1997 | Gahleitner et al. |
| 5,700,896 A | 12/1997 | Dolle et al. |
| 5,703,187 A | 12/1997 | Timmers |
| 5,703,197 A | 12/1997 | Gordon et al. |
| 5,703,257 A | 12/1997 | Rosen et al. |
| 5,710,224 A | 1/1998 | Alt et al. |
| 5,721,185 A | 2/1998 | LaPointe et al. |
| 5,728,855 A | 3/1998 | Smith et al. |
| 5,731,253 A | 3/1998 | Sangokoya |
| 5,747,621 A | 5/1998 | Resconi et al. |
| 5,753,773 A | 5/1998 | Langhauser et al. |
| 5,760,141 A | 6/1998 | Watanabe et al. |
| 5,763,534 A | 6/1998 | Srinivasan et al. |
| 5,767,208 A | 6/1998 | Turner et al. |
| 5,840,389 A | 11/1998 | Asanuma et al. |
| 5,840,808 A | 11/1998 | Sugimura et al. |
| 5,844,045 A | 12/1998 | Kolthammer et al. |
| 5,869,575 A | 2/1999 | Kolthammer et al. |
| 5,869,584 A | 2/1999 | Winter et al. |
| 5,874,505 A | 2/1999 | Saito et al. |
| 5,883,188 A | 3/1999 | Hwang et al. |
| 5,883,204 A | 3/1999 | Spencer et al. |
| 5,891,976 A | 4/1999 | Costa et al. |
| 5,907,021 A | 5/1999 | Turner et al. |
| 5,910,224 A | 6/1999 | Morman |
| 5,919,983 A | 7/1999 | Rosen et al. |
| 5,922,822 A | 7/1999 | Wilson et al. |
| 5,929,147 A | 7/1999 | Pierick et al. |
| 5,936,053 A | 8/1999 | Fukuoka et al. |
| 5,945,496 A | 8/1999 | Resconi et al. |
| 5,959,046 A | 9/1999 | Imuta et al. ................ 526/127 |
| 5,962,714 A | 10/1999 | McCullough et al. |
| 5,965,677 A | 10/1999 | Stephan et al. |
| 5,965,756 A | 10/1999 | McAdon et al. |
| 5,972,822 A | 10/1999 | Timmers et al. |
| 5,977,251 A | 11/1999 | Kao et al. |
| 5,994,482 A | 11/1999 | Georgellis et al. |
| 5,998,039 A | 12/1999 | Tanizaki et al. |
| 6,001,933 A | 12/1999 | Tsuruoka et al. |
| 6,005,049 A | 12/1999 | Rebhan et al. |

| | | | |
|---|---|---|---|
| 6,013,819 A | 1/2000 | Stevens et al. | |
| 6,015,868 A | 1/2000 | Nickias et al. | |
| 6,034,021 A | 3/2000 | Wilson et al. | |
| 6,034,240 A | 3/2000 | LaPointe | |
| 6,037,417 A | 3/2000 | Nguyen et al. | |
| 6,043,363 A | 3/2000 | LaPointe et al. | |
| 6,048,950 A | 4/2000 | Dolle et al. | |
| 6,074,977 A | 6/2000 | Rosen et al. | |
| 6,103,657 A | 8/2000 | Murray | |
| 6,111,046 A | 8/2000 | Resconi et al. | |
| 6,117,962 A | 9/2000 | Weng et al. | |
| 6,140,442 A | 10/2000 | Knight et al. | |
| 6,150,297 A | 11/2000 | Campbell, Jr. et al. | |
| 6,153,702 A | 11/2000 | Somers | |
| 6,153,703 A | 11/2000 | Lustiger et al. | |
| 6,156,846 A | 12/2000 | Tsuruoka et al. | |
| 6,162,887 A | 12/2000 | Yamada et al. | |
| 6,169,151 B1 | 1/2001 | Waymouth et al. | |
| 6,176,952 B1 | 1/2001 | Maugans et al. | |
| 6,190,768 B1 | 2/2001 | Turley et al. | |
| 6,197,886 B1 | 3/2001 | Chatterjee et al. | |
| 6,207,756 B1 | 3/2001 | Datta et al. | |
| 6,211,300 B1 | 4/2001 | Terano et al. | |
| 6,225,243 B1 | 5/2001 | Austin | |
| 6,245,856 B1 | 6/2001 | Kaufman et al. | |
| 6,248,829 B1 | 6/2001 | Fischer et al. | |
| 6,251,997 B1 | 6/2001 | Imai et al. | |
| 6,265,513 B1 | 7/2001 | Murray et al. | |
| 6,268,063 B1 | 7/2001 | Kaminaka et al. | |
| 6,268,444 B1 | 7/2001 | Klosin et al. | |
| 6,268,447 B1 | 7/2001 | Murray et al. | |
| 6,274,678 B1 | 8/2001 | Shinozaki et al. | |
| 6,284,857 B1 | 9/2001 | Shinozaki et al. | |
| 6,303,719 B1 | 10/2001 | Murray et al. | |
| 6,306,973 B1 | 10/2001 | Takaoka et al. | |
| 6,313,226 B1 | 11/2001 | Yasaka et al. | |
| 6,319,991 B1 | 11/2001 | Okayama et al. | |
| 6,320,002 B1 | 11/2001 | Murray et al. | |
| 6,320,005 B1 | 11/2001 | Murray | |
| 6,320,009 B1 | 11/2001 | Nakano et al. | |
| 6,323,389 B1 | 11/2001 | Thomas et al. | |
| 6,326,432 B1 | 12/2001 | Fujita et al. | |
| 6,340,730 B1 | 1/2002 | Murray et al. | |
| 6,342,564 B1 | 1/2002 | Pitkanen et al. | |
| 6,342,565 B1* | 1/2002 | Cheng et al. | 525/191 |
| 6,388,040 B1 | 5/2002 | Fujita et al. | 526/348 |
| 6,515,155 B1 | 2/2003 | Klosin et al. | |
| 6,525,157 B1 | 2/2003 | Cozewith et al. | 526/348 |
| 6,552,149 B1 | 4/2003 | Alastalo et al. | 526/348.6 |
| 6,635,715 B1* | 10/2003 | Datta et al. | 525/240 |
| 6,642,316 B1* | 11/2003 | Datta et al. | 525/240 |
| 6,750,284 B1* | 6/2004 | Dharmarajan et al. | 524/515 |
| 6,867,260 B1* | 3/2005 | Datta et al. | 525/191 |
| 6,921,794 B1* | 7/2005 | Cozewith et al. | 525/240 |
| 6,927,258 B1* | 8/2005 | Datta et al. | 525/240 |
| 7,019,081 B1* | 3/2006 | Datta et al. | 525/240 |
| 7,026,404 B1* | 4/2006 | Cozewith et al. | 525/240 |
| 7,026,405 B1* | 4/2006 | Cozewith et al. | 525/240 |
| 7,034,078 B1* | 4/2006 | Cozewith et al. | 525/240 |
| 7,049,372 B1* | 5/2006 | Datta et al. | 525/240 |
| 7,056,982 B1* | 6/2006 | Datta et al. | 525/240 |
| 2001/0021732 A1 | 9/2001 | Terano et al. | |
| 2001/0034411 A1 | 10/2001 | Burkhardt et al. | |
| 2001/0034426 A1 | 10/2001 | Waymouth et al. | |
| 2001/0039314 A1 | 11/2001 | Mehta et al. | |
| 2002/0004575 A1 | 1/2002 | Cozewith et al. | |
| 2002/0006993 A1 | 1/2002 | Shinozaki et al. | |
| 2002/0019507 A1 | 2/2002 | Karandinos et al. | |
| 2002/0035210 A1 | 3/2002 | Silvestri et al. | |
| 2002/0062011 A1 | 5/2002 | Campbell, Jr. et al. | |
| 2002/0137845 A1 | 9/2002 | Boussie et al. | |
| 2002/0142912 A1 | 10/2002 | Boussie et al. | |
| 2002/0147288 A1 | 10/2002 | Boussie et al. | |
| 2002/0151662 A1 | 10/2002 | Campbell, Jr. et al. | |
| 2002/0156279 A1 | 10/2002 | Boussie et al. | |
| 2002/0165329 A1 | 11/2002 | Klosin et al. | |
| 2002/0173419 A1 | 11/2002 | Boussie et al. | |
| 2002/0177711 A1 | 11/2002 | LaPointe et al. | |
| 2003/0004286 A1 | 1/2003 | Klosin et al. | |
| 2004/0014896 A1 | 1/2004 | Datta et al. | 525/240 |
| 2004/0236026 A1 | 11/2004 | Datta et al. | 525/240 |
| 2004/0236042 A1 | 11/2004 | Datta et al. | 526/126 |
| 2005/0043489 A1 | 2/2005 | Datta et al. | 525/240 |
| 2005/0054781 A1* | 3/2005 | Dharmarajan et al. | 525/240 |
| 2005/0107529 A1* | 5/2005 | Datta et al. | 525/70 |
| 2005/0113522 A1 | 5/2005 | Datta et al. | 525/240 |
| 2005/0131150 A1 | 6/2005 | Datta et al. | 525/191 |
| 2005/0131155 A1 | 6/2005 | Cozewith et al. | 525/192 |
| 2005/0131157 A1 | 6/2005 | Datta et al. | 525/240 |
| 2005/0137343 A1* | 6/2005 | Datta et al. | 525/240 |
| 2005/0159553 A1 | 7/2005 | Cozewith et al. | 525/192 |
| 2005/0171285 A1 | 8/2005 | Cozewith et al. | 525/192 |
| 2005/0197461 A1 | 9/2005 | Datta et al. | 525/240 |
| 2005/0203252 A1* | 9/2005 | Datta et al. | 525/240 |
| 2005/0209405 A1* | 9/2005 | Datta et al. | 525/240 |
| 2005/0209406 A1* | 9/2005 | Datta et al. | 525/240 |
| 2005/0209407 A1 | 9/2005 | Datta et al. | 525/240 |
| 2005/0282963 A1* | 12/2005 | Datta et al. | 525/240 |
| 2005/0282964 A1 | 12/2005 | Datta et al. | 525/240 |
| 2005/0288444 A1* | 12/2005 | Datta et al. | 525/240 |
| 2006/0004145 A1 | 1/2006 | Datta et al. | 525/240 |
| 2006/0004146 A1* | 1/2006 | Datta et al. | 525/240 |
| 2006/0025531 A1* | 2/2006 | Datta et al. | 525/240 |
| 2006/0100384 A1* | 5/2006 | Datta et al. | 525/240 |

FOREIGN PATENT DOCUMENTS

| | | |
|---|---|---|
| EP | 0 128 046 | 12/1984 |
| EP | 128 046 | 12/1984 |
| EP | 0 229 476 | 7/1987 |
| EP | 0 277 003 | 8/1988 |
| EP | 0 277 003 A1 | 8/1988 |
| EP | 0 277 004 | 8/1988 |
| EP | 0 302 424 | 2/1989 |
| EP | 0 369 658 B1 | 5/1990 |
| EP | 0 374 695 | 6/1990 |
| EP | 374 695 | 6/1990 |
| EP | 0 426 637 | 5/1991 |
| EP | 0 427 697 | 5/1991 |
| EP | 426 637 A2 | 5/1991 |
| EP | 427 697 A2 | 5/1991 |
| EP | 0 468 537 A1 | 1/1992 |
| EP | 0 468 651 A1 | 1/1992 |
| EP | 0 480 190 | 4/1992 |
| EP | 0 890 584 A1 | 4/1992 |
| EP | 0 495 375 | 7/1992 |
| EP | 0 496 260 B1 | 7/1992 |
| EP | 495 375 A2 | 7/1992 |
| EP | 0 514 828 A1 | 11/1992 |
| EP | 0 515 203 A2 | 11/1992 |
| EP | 0 515 203 A3 | 11/1992 |
| EP | 0 520 732 | 12/1992 |
| EP | 520 732 | 12/1992 |
| EP | 0 538 749 | 4/1993 |
| EP | 0 546 690 | 6/1993 |
| EP | 0 550 214 | 7/1993 |
| EP | 550 214 | 7/1993 |
| EP | 0 573 403 | 12/1993 |
| EP | 573 403 | 12/1993 |
| EP | 0 582 194 | 2/1994 |
| EP | 0 593 083 A1 | 4/1994 |
| EP | 0 628 343 A1 | 12/1994 |
| EP | 629 631 | 12/1994 |
| EP | 629 632 | 12/1994 |
| EP | 0 646 624 | 4/1995 |
| EP | 0 695 765 | 4/1995 |

| | | |
|---|---|---|
| EP | 0 651 012 B1 | 5/1995 |
| EP | 0 480 190 B1 | 6/1995 |
| EP | 0 659 773 A1 | 6/1995 |
| EP | 0 663 422 A2 | 7/1995 |
| EP | 695 765 | 7/1995 |
| EP | 0 676 421 A1 | 10/1995 |
| EP | 0 683 176 A1 | 11/1995 |
| EP | 0 692 500 A1 | 1/1996 |
| EP | 0 697 420 A1 | 2/1996 |
| EP | 0 699 213 B1 | 3/1996 |
| EP | 0 374 695 | 6/1996 |
| EP | 0 716 121 | 6/1996 |
| EP | 0 716 121 A1 | 6/1996 |
| EP | 0 721 798 A2 | 7/1996 |
| EP | 0 728 150 B1 | 8/1996 |
| EP | 0 728 151 B1 | 8/1996 |
| EP | 0 728 771 A1 | 8/1996 |
| EP | 0 728 772 A1 | 8/1996 |
| EP | 0 735 058 A1 | 10/1996 |
| EP | 0 748 846 A2 | 12/1996 |
| EP | 0 721 798 A3 | 1/1997 |
| EP | 0 748 846 A3 | 2/1997 |
| EP | 0 780 404 A2 | 6/1997 |
| EP | 0 796 884 | 9/1997 |
| EP | 0 780 404 A3 | 12/1997 |
| EP | 0 844 280 A1 | 5/1998 |
| EP | 0 890 584 | 1/1999 |
| EP | 0 949 278 A2 | 10/1999 |
| EP | 0 949 279 A2 | 10/1999 |
| EP | 0 949 278 A3 | 9/2000 |
| EP | 0 949 279 A3 | 9/2000 |
| EP | 1 063 244 A2 | 12/2000 |
| GB | 1 342 647 | 1/1974 |
| JP | 62-121707 | 6/1987 |
| JP | 62-119212 | 6/1994 |
| JP | 1997012635 A | 1/1997 |
| WO | WO 87/02991 | 5/1987 |
| WO | WO 88/05792 A1 | 8/1988 |
| WO | WO 88/05793 A1 | 8/1988 |
| WO | WO 90/01521 A1 | 2/1990 |
| WO | WO 90/07526 A1 | 7/1990 |
| WO | WO 92/00333 | 1/1992 |
| WO | WO 93/06169 | 4/1993 |
| WO | WO 93/11171 | 6/1993 |
| WO | WO 93/18106 | 9/1993 |
| WO | WO 93/19104 A1 | 9/1993 |
| WO | WO 93/21238 A2 | 10/1993 |
| WO | WO 93/21238 A3 | 10/1993 |
| WO | WO 93/21242 A1 | 10/1993 |
| WO | WO 93/25590 A1 | 12/1993 |
| WO | WO 94/00500 A1 | 1/1994 |
| WO | WO 94/03506 A1 | 2/1994 |
| WO | WO 94/25495 | 11/1994 |
| WO | WO 94/25497 | 11/1994 |
| WO | WO 94/26793 | 11/1994 |
| WO | WO 94/28032 | 12/1994 |
| WO | WO 94/29032 | 12/1994 |
| WO | WO 95/00526 A1 | 1/1995 |
| WO | WO 95/07942 | 3/1995 |
| WO | WO 95/13305 A1 | 5/1995 |
| WO | WO 95/13306 A1 | 5/1995 |
| WO | WO 96/00244 A1 | 1/1996 |
| WO | WO 96/06132 | 2/1996 |
| WO | WO 96/13530 A1 | 5/1996 |
| WO | WO 96/23010 A2 | 8/1996 |
| WO | WO 96/24623 | 8/1996 |
| WO | WO 97/10300 | 3/1997 |
| WO | WO 97/22635 A1 | 6/1997 |
| WO | WO 97/25355 | 7/1997 |
| WO | WO 97/42241 A1 | 11/1997 |
| WO | WO 98/39384 | 9/1998 |
| WO | WO 98 39384 | 9/1998 |
| WO | WO 98/41529 A1 | 9/1998 |
| WO | WO 98/50392 A1 | 11/1998 |
| WO | WO 99/01485 | 1/1999 |
| WO | WO 99/07788 | 2/1999 |
| WO | WO 99/14250 A1 | 3/1999 |
| WO | 1 017 729 A2 | 1/2000 |
| WO | WO 00/01745 A1 | 1/2000 |
| WO | WO 00/59661 A1 | 10/2000 |
| WO | WO 00/69964 A1 | 11/2000 |
| WO | WO 00/69965 A1 | 11/2000 |
| WO | WO 01/74910 A2 | 10/2001 |
| WO | WO 02/38628 A2 | 5/2002 |

OTHER PUBLICATIONS

Hu et al., "Elastomeric Polypropylenes from Unbridged (2-Phenylindene)zirconocene Catalysts: Thermal Characterization and Mechanical Properties," Macromolecules, vol. 31, pp. 6908-6916 (1999).

Cheng, H.N., "C NMR Analysts of Ethylene-Propylene Rubbers," Macromolcules, vol. 17, pp. 1950-1955, (1984).

Tincul et al., "Impact Fracture Tougness of Propylene/1-Pentene Random Copolymers," Polymer Material Material Sci. Eng., PMSEDG 79, pp. 190-191, (1998).

Strate et al., "Near Monodisperse Ethylene-Propylene Copolymers by Direct Ziegler-Natta Polymerization. Preparation, Characterization, Properties," Macromolecules, v.21(12), pp. 3360-3371, (1988).

Collette et al., "Elastomeric Polypropylenes from Alumina-Supported Tetraalkyl Group IVB Catalysts. I. Synthesis and Properties of High Molecular Weight Stereoblcok Hopolymers," Macromolecules, vol. 22, pp. 3851-3858, (1989).

ASTM D 1646-96a "Standard Test Methods for Rubber—Viscosity, Stress Relaxation, and Pre-Vulcanization Characteristics (Mooney Viscometer)," American Society for Testing and Materials.

Lin et al, "Regioirregular Propene insertion on Propropenes Synthesized with Unbridged Bis(2-aryl)indenyl Zirconium Dichloride Catalysts: Implications on Activity," Macromolecules, vol. 32, pp. 8283-8290, (1990).

Coates et al., "Oscillating Stereocontrol: A strategy for the Synthesis of Thermoplastic Elastomeric Polypropylene," Science, vol. 267, pp. 217-219, (1995).

Hu et al., "Elastomeric Polypropylenes from Unbridged 2-Phenylindene Zirconocene Catalysts: Temperature Dependence of Crystallinity and Relaxation Properties," Macromolecules, vol. 32, pp. 3334-3340 (1999).

HIPOL, data provided by IDES, Mitsui Chemicals America, Inc. HIPOL™ J700, (2003).

European Opposition: Notice of Opposition against EP 1 003 814 BI, filed by Dow Chemical Company, Jul. 2, 2003.

European Opposition: Reply Brief filed in response to Dow Chemical Notice of Opposition, filed by ExxonMobil Chemical Patents, Inc., Jun. 11, 2004.

JP translation for Application No. S62-119215, entitled "Propylene-Based Random Co-Polymer and Its Usage", Kokai Patent official Gazette, published May 30, 1987.

U.S. Appl. No. 11/297,870, filed Dec. 9, 2005, entitled "Propylene Alpha-Olefin Polymers".

U.S. Appl. No. 11/299,100, filed Dec. 9, 2005, entitled "Propylene Alpha-Olefin Polymer Blends".

U.S. Appl. No. 11/297,871, filed Dec. 9, 2005, entitled "Process for Producing Propylene Alpha-Olefin Polymers".

U.S. Appl. No. 11/351,187, filed Feb. 9, 2006, entitled "Alpha-Olefin/Propylene Copolymers and Their Use".

U.S. Appl. No. 11/351,186, filed Feb. 9, 2006, entitled "Alpha-Olefin/Propylene Copolymers and Their Use".

U.S. Appl. No. 11/350,459, filed Feb. 9, 2006, entitled "Alpha-Olefin/Propylene Copolymers and Their Use".

U.S. Appl. No. 11/298,143, filed Dec. 9, 2005, entitled "Propylene Olefin Copolymer", Datta et al.

U.S. Appl. No. 11/298,146, filed Dec. 9, 2005, entitled "Elastic Blends Comprising Crystalline Polymer and Crystallizable Polymers of Propylene", Datta et al.

U.S. Appl. No. 11/352,558, filed Feb. 13, 2006, entitled "Propylene Olefin Copolymer", Datta et al.

Polypropylene Handbook, Polymerization, Characterization, Properties, Processing, Applications, Edward P. Moore, Jr., New York, 1996.

Polyolefines, entitled "High Density Polyethylene", "Linear Low Density Polyethlene/Medium Density Polyethylene", "Low Density Polyethylene", and "Propylene" Mitsui Petrochemical Industries, Ltd., Japan, Mar. 29, 2005.

Project Report, entitled "Laboratory Studies of the $TiCl_3$-Catalyzed Block Copolymerization of Propylene and Ethylene Using Gas-Phase Spiking and Sequential Monomer Methods", N. M. Golembeski, New Jersey, Sep. 10, 1982.

Opposition Submission to EP 1 003 814, Mar. 24, 2005.

Polymer Engineering and Science, vol. 36, No. 21, entitled Effect of the Crystallinity and Morphology on the Microcellular Foam Structure of Semicrystalline Polymers, Doroudiani et al., pp. 2645-2662, Canada, 1996.

Plastics Edition 8, Thermoplastics and Thermosets, 1986.

JP translation for Application No. S62-121707, entitled "Process for Production of ∝-Olefin Type Random Copolymers", Tsutsui et al., published Jun. 3, 1987.

JP translation for Publication of Patent Application No. Hei 06(1994)-104698, entitled "Propylene Random Copolymers and Heat-Sealing Modifier for Thermoplastic Resins Containing the Same", Tsutsui et al., published May 30, 1987.

U.S. Appl. No. 11/336,578, filed Jan. 20, 2006, entitled "Blends Made from Propylene Ethylene Polymers".

News Release, Japan Polychem Launches WINTEC Metallocente-Based PP Random Copolymer, Oct. 25, 2001, http://www.m-kagaku.co.jp/english/rel/2001/102501.htm.

Abramovitch, Ruloph A., et al., *J. Org. Chem.*, 1977, 42, 17, 2920-2926.

Alt, Helmut G., et al., *Chem. Rev.*, 2000, 100, 1205-1221.

Brintzinger, Hans H., et al, *Angew Chem. Int. Ed. Engl.*, 1995, 34, 1143-1170.

Chen, Eugene You-Xian, et al., *Chem. Rev.*, 2000, 100, 1391-1434.

Coates, Geoffrey W., *Chem. Rev.*, 2000, 100, 1223-1252.

Hazlitt, Lonnie G., *Journal of Applied Polymer Science: Applied Power Symposium*, 1990, 45, 25-37.

Herzog, Timothy A., et al., *J. Am. Chem. Soc.*, 1996, 118, 11988-11989.

Ittel, Steven D., et al., *Chem. Rev.*, 2000, 100, 1169-1203.

Kaminsky, Walter, et al., *J. Polymer Sci.*, 1985, 2151-2164.

*The Encyclopedia of Chemical Technology*, Kirk-Othmer, Third Edition, John Wiley & Sons, New York, 1981, vol. 16, 415-417.

*The Encyclopedia of Chemical Technology*, Kirk-Othmer, Third Edition, John Wiley & Sons, New York, 1981, vol. 18, 191-192.

Lambert, Joseph B., et al., *J. Chem. Soc., Chem. Commun.*, 1993, 383-384.

Lambert, Joseph B., et al., *Organometallics*, 1994, 13, 2430-2443.

Mathur, Naresh C. et al., *Tetrahedron*, 1985, vol. 41, No. 8, 1509-1516.

Otocka, E.P., et al., *Macromolecules*, Jul.-Aug. 1971, vol. 4, No. 4, 507-514.

Randall, James C., *JMS-Rev. Macromol. Chem. Phys.*, 1989, C29 (2 & 3), 201-317.

Resonci, Luigi, et al., *Chem. Rev.*, 2000, 100, 1253-1345.

Scholte, Th. G., et al., *Journal of Applied Polymer Science*, 1984, vol. 29, 3763-3782.

Scollard, John D., et al., *J. Am. Chem. Soc.*, 1996, 118, 10008-10009.

Veghini, Dario, et al., *J. Am. Chem. Soc.*, 1999, 121, 564-573.

Wang, Chunming, et al., *Organometallics*, 1998, vol. 17, No. 15, 3149-3151.

Wild, L. et al., *Journal of Polymer Science Polymer Physics Edition*, 1982, vol. 20, 441-455.

Younkin, Todd R., et al., *Science*, 2000, vol. 287, Issue 5452, 460-462.

Product Sample Report for Escorenc PP 4292, Polymer Science Laboratory of the Baytown Polymer Center, Exxon Chemical, May 9, 2000.

ASTM D 1646-96a—"Standard Test Methods for Rubber—Viscosity, Stress Relaxation, and Pre-vulcanization Characteristics (Mooney Viscometer)," *American Society for Testing & Materials, Annual Book of ASTM Standards*, 1997, vol. 09.01, 313-322.

ASTM D 3900-95—"Standard Test Methods for Rubber Raw—Determination of Ethylene Units in EPM (Ethylene-Propylene Copolymers) and EPDM (Ethylene-Propylene-Diene Terpolymers)," *American Society for Testing & Materials, Annual Book of ASTM Standards*, 1997, vol. 09.01, 616-624.

H.N. Cheng, "$^{13}$C NMR Analysis of Ethylene-Propylene Rubbers," *Macromolecules*, 1984, vol. 17, 1950-1955.

G. Ver Strate et al., "Near Monodisperse Ethylene-Propylene Copolymers by Direct Ziegler-Natta Polymerization Properties, Characterization, Properties," *Macromolecules*, 1988, vol. 21, 3360-3371.

J.W. Collette, et al., "Elastomeric Polypropylenes from Alumina-Supported Tetraalkyl Group IVB Catalysts. 1. Synthesis and Properties of High Molecular Weight Stereoblock Hopolymers," *Macromolecules*, 1989, vol. 22, 3851-3858.

W.J. Gauthier, et al., , "Elastomeric Poly(propylene): Influence of Catalyst Structure and Polymerization Conditions on Polymer Structure and Properties," *Macromolecules*, 1995, vol. 28, 3771-3778.

Y. Hu et al., "Elastomeric Polypropylenes from Unbridged (2-Phenylindene)zirconocene Catalysts: Thermal Characterization and Mechanical Properties," *Macromolecules*, 1998, vol. 31, 6908-6916.

Y. Hu, et al., "Elastomeric Polypropylenes from Unbridged 2-Phenylindene Zirconocene Catalysts: Temperature Dependence of Crystallinity and Relaxation Properties," *Macromolecules*, 1999, 32, 3334-3340.

E.D. Carlson, et al., "Component Relaxation Processes within Elastomeric Polypropylene," *Macromolecules*, 1999, 32, 8100-8106.

S. Lin, et al., "Regioirregular Propene Insertion in Polypropenes Synthesized with Unbridged Bis(2-aryl)indenyl Zirconium Dichloride Catalysts: Implications on Activity," *Macromolecules*, 1999, 32, 8283-8290.

J. Chien, et al., "Two-State Propagation Mechanism for Propylene Polymerization Catalyzed by rac-anti- Ethylidene(1-$\eta^5$-tetramethylcyclo-pentadienyl)(1-$\eta^5$-indenyl)dimethyltitanium," *Journal of the American Chemical Society*, 1991, vol. 113, 8569-8570.

E. Hauptman, et al., "Stereoblock Polypropylene: Ligand Effects on the Stereospecificity of 2-Arylindene Zirconocene," *Journal of the American Chemical Society*, 1995, vol. 117, 11586-11587.

M.D. Bruce, et al., "Effect of Metal on the Stereospecificity of 2-Arylindene Catalysts for Elastomeric Polypropylene," *Journal of the American Chemical Society*, 1997, vol. 119, 11174-11182.

Painter et al., entitled "Fundamentals of Polymer Science, An Introductory Text", Second Edition, 1997, Technomic Publishing Company, Pennsylvania, pp. 237-242.

Alfred Rudin, entitled "The Elements of Polymer Science and Engineering" Second Edition, 1999, Academic Press, San Diego, pp. 384-385.

Malcolm P. Stevens, entitled "Polymers Chemistry, An Introduction" Third Edition, 1999, Oxford University Press, New York, pp. 140-141.

G. W. Coates, et al., "Oscillating Stereocontrol: A Strategy for the Synthesis of Thermoplastic Elastomeric Polypropylene," *Science*, 1995, 267, 271-219.

I. Tincui et al., "Impact Fracture Toughness of Propylene/1-Pentene Random Copolymers," *Proceedings of the American Chemical Society Division of Polymeric Materials: Science and Engineering*, 1998, 79, 190-191.

* cited by examiner

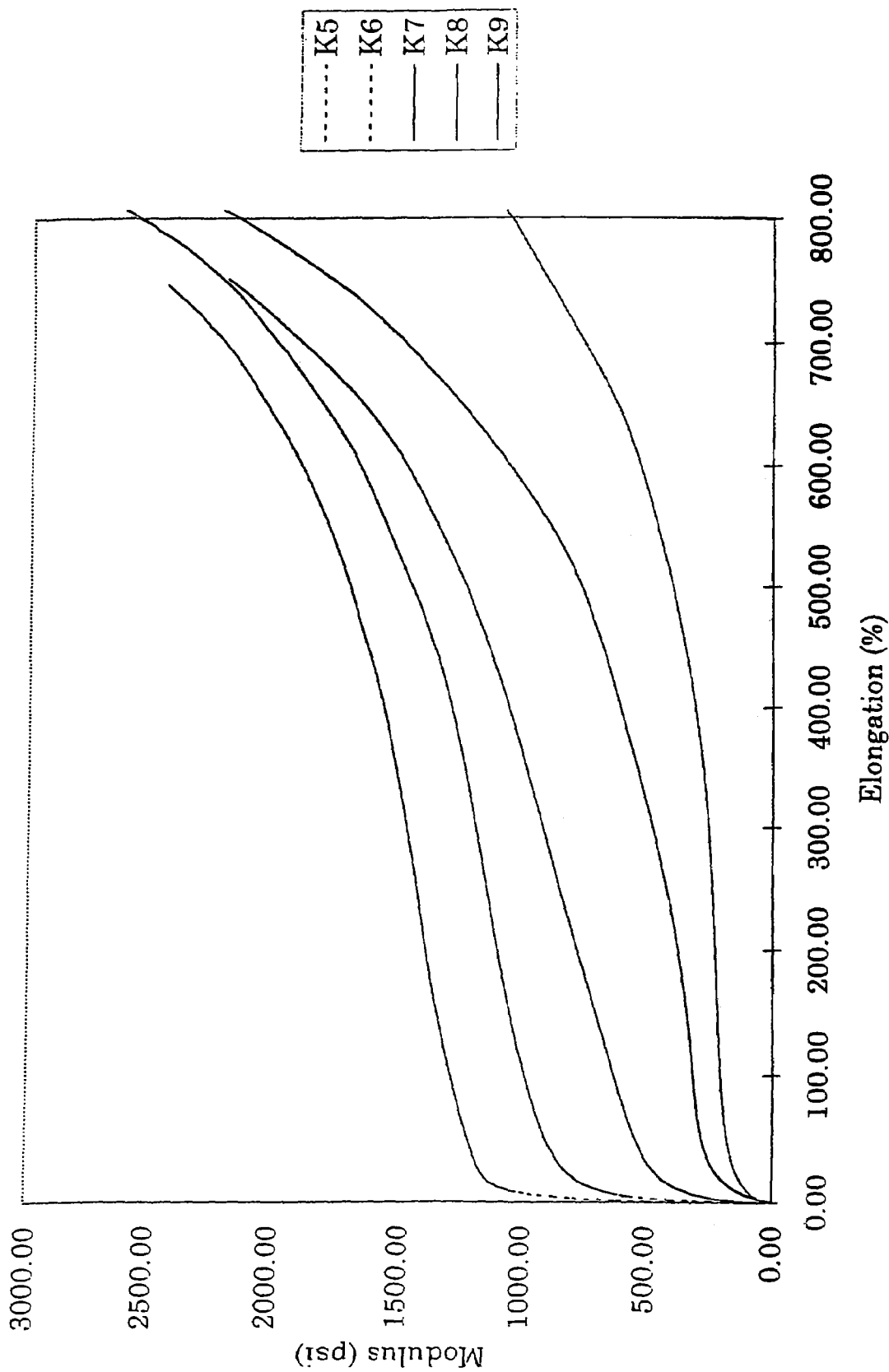

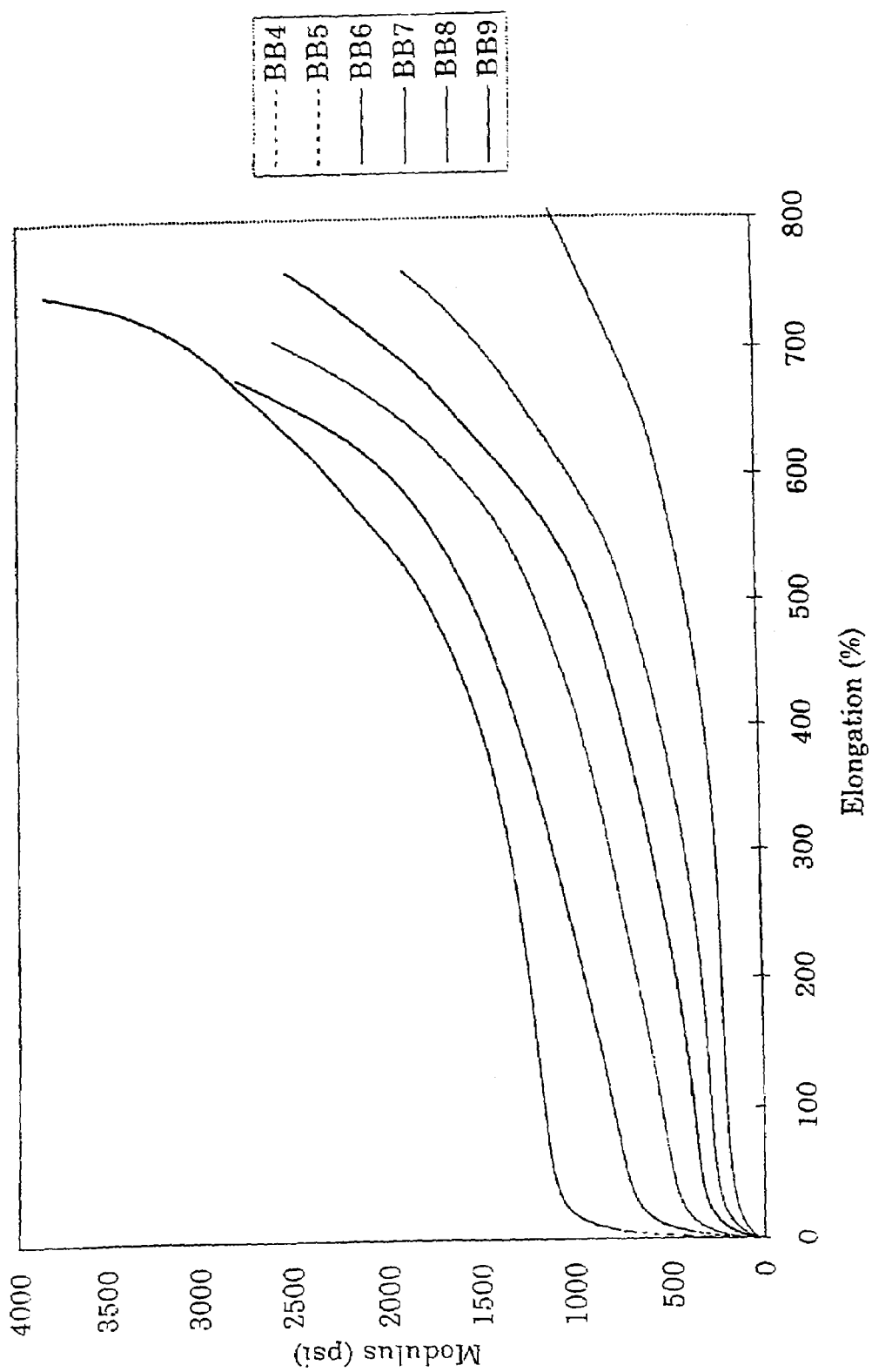

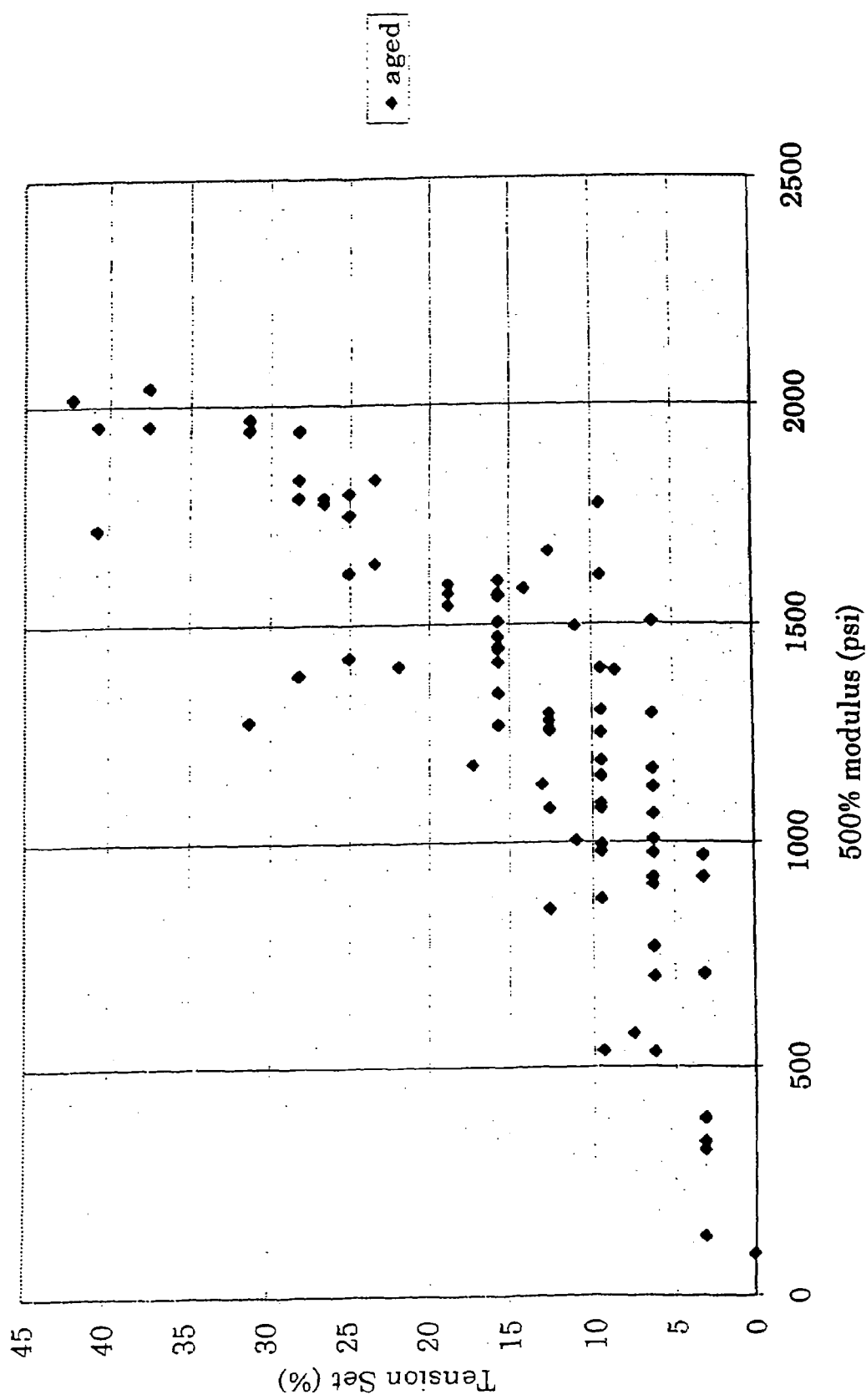

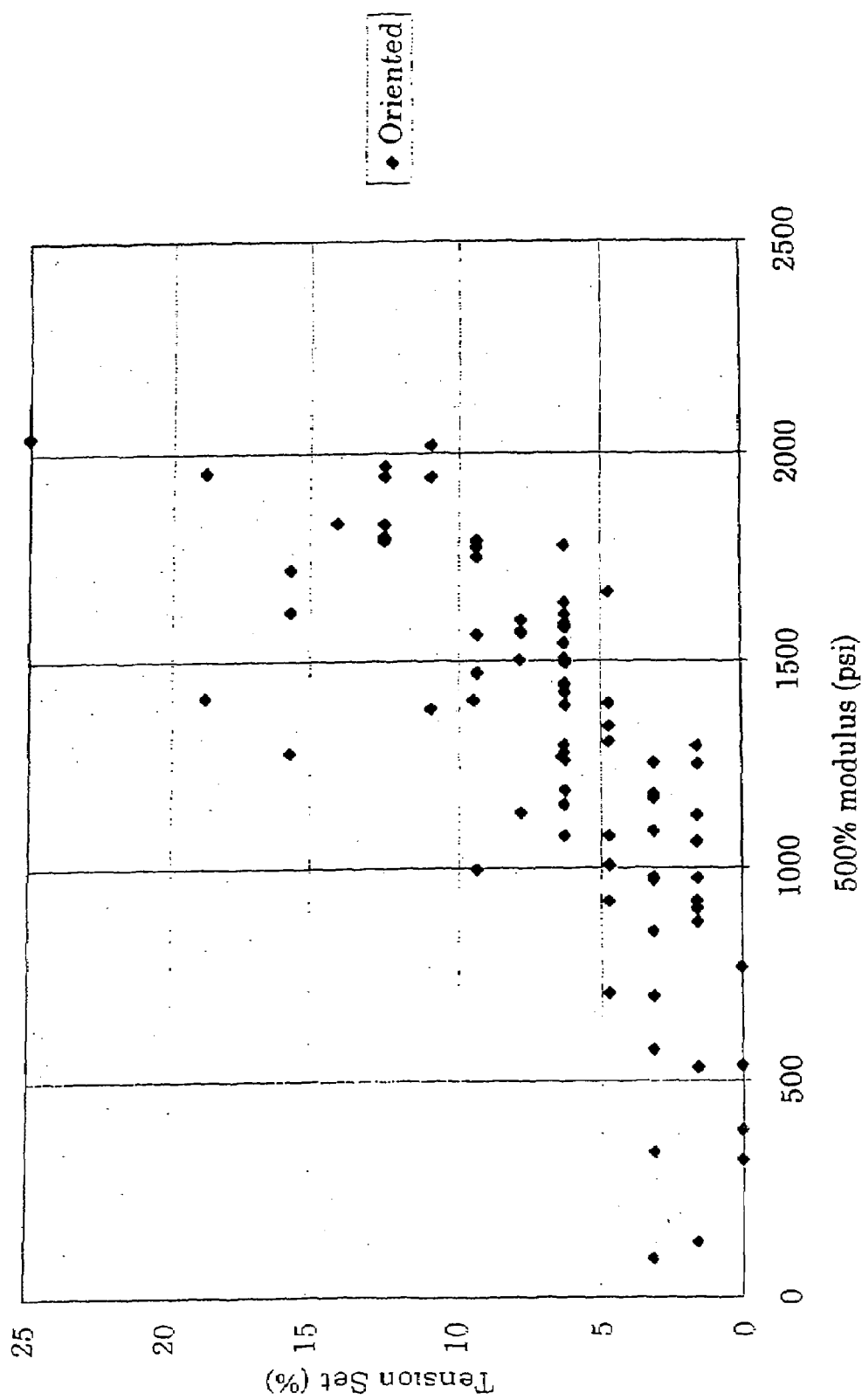

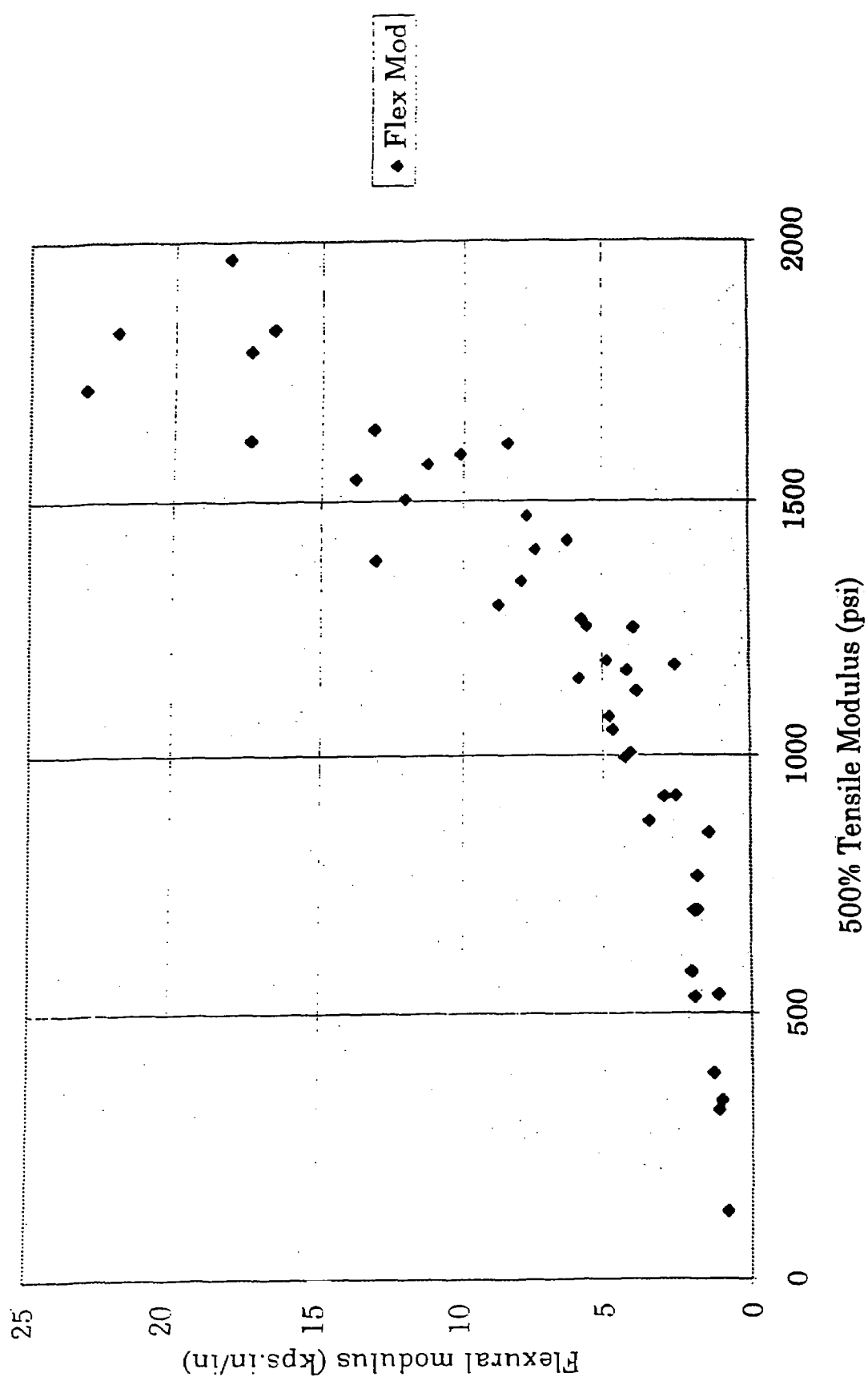

ELASTIC BLENDS COMPRISING CRYSTALLINE POLYMER AND CRYSTALLIZABLE POLYMERS OF PROPYLENE

CROSS REFERENCE TO RELATED APPLICATIONS

This application is a continuation of Ser. No. 10/846,256, filed May 14, 2004, which is a continuation of Ser. No. 10/613,374, filed Jul. 3, 2003, U.S. Pat. No. 6,927,258, which is a continuation of Ser. No. 09/342,854, filed Jun. 29, 1999, U.S. Pat. No. 6,642,316 which is a continuation-in-part of Ser. No. 09/108,467, filed Jul. 1, 1998, now abandoned, the disclosures of which are herein incorporated by reference in their entireties.

FIELD OF THE INVENTION

The invention relates to a blend of at least two thermoplastic components differing in their crystallinities. The blend has a heterogeneous morphology with distinct phase separated zones of different composition and crystallinity present. The resulting blend with the defined morphology shows dramatic improvements in mechanical deformation recoverability when compared to its individual unblended components. The invention also relates to improvements in the flexibility of the blend. Changes in the relative amounts or the crystallinities of the blend components or the morphology of the blend affect the recoverability and the flexibility of the blend.

The inventive blends designed for recoverability contains a dispersed phase of a greater crystallinity and a continuous phase of lesser crystallinity. The sizes of the individual domains of the dispersed phase are very small with the smallest length dimension for the dispersed phase being less than 5 μm. This phase size of the dispersed phase is maintained during processing even without crosslinking. The inventive blends designed for flexibility have a slightly wider range in morphology as the components of greater and lesser crystallinity can also be co-continuous. The components of the blend in both cases are also compatible to the extent that no compatibilizer needs to be added to attain and retain this fine morphology. Furthermore, this invention describes improving the mechanical deformation recoverability of the aforementioned blends by aging the blends and mechanically orienting the articles formed from these blends.

One of the components is a polymer comprising predominately stereospecific polypropylene, preferably isotactic polypropylene. This is the component with greater crystallinity. A second component is a copolymer of propylene and a $C_2$, $C_3$–$C_{20}$ α-olefin, preferably ethylene. This is the component with lesser crystallinity. In the copolymer the propylene is polymerized substantially stereospecifically. The copolymer has a substantially uniform composition distribution preferably as a result of polymerization with a metallocene catalyst. Most preferably, said second component is an ethylene propylene copolymer, e.g. ethylene propylene semicrystalline elastomer.

BACKGROUND OF THE INVENTION

There is a need in the art for polymeric blends having a stereospecific polypropylene component with good tensile strength while still providing suitable mechanical recoverability (elastic recovery) and flexibility (low flexural modulus). This invention is aimed at improving the aforementioned properties of blends having a stereoregular polypropylene component, especially isotactic polypropylene. This is achieved by blending the stereoregular polypropylene component with a copolymer of propylene and a $C_2$, $C_3$–$C_{20}$ α-olefin. This copolymer is less crystalline than the isotactic polypropylene. In the copolymer the propylene is polymerized substantially stereospecifically. Most preferably, the copolymer is an ethylene propylene copolymer, e.g., ethylene propylene thermoplastic elastomer. The copolymer has a substantially uniform composition distribution preferably as a result of polymerization with a metallocene catalyst Composition distribution is a property of copolymers indicating a statistically significant intermolecular or intramolecular difference in the composition of the polymer. Methods for measuring compositional distribution are described later.

Blends of isotactic polypropylene and ethylene propylene rubber are well known in the prior art. However, the traditional Ziegler-Natta catalysts cannot make ethylene propylene thermoplastic elastomers which simultaneously are uniform in compositional distribution, have substantially stereospecific propylene residues and have less than 35 wt. % ethylene.

U.S. Pat. No. 3,882,197 to Fritz et al. describes blends of stereoregular propylene/alpha-olefin copolymers, stereoregular propylene, and ethylene copolymer rubbers. In U.S. Pat. No. 3,888,949 Chi-Kai Shih, assigned to E I Du Pont, shows the synthesis of blend compositions containing isotactic polypropylene and copolymers of propylene and an alpha-olefin, containing between 6–20 carbon atoms, which have improved elongation and tensile strength over either the copolymer or isotactic polypropylene. Copolymers of propylene and alpha-olefin are described wherein the alpha-olefin is hexene, octene or dodecene. However, the copolymer is made with a heterogeneous titanium catalyst resulting in copolymers with non-uniform composition distribution and a broad molecular weight distribution. Non-uniform intramolecular compositional distribution is evident in U.S. Pat. No. 3,888,949 by the use of the term "block" in the description of the polymer where the copolymer is described as having "sequences of different alpha-olefin content." Within the context of the invention described above the term sequences describes a number of olefin monomer residues linked together by chemical formed during polymerization.

In U.S. Pat. No. 4,461,872, A.C.L. Su improved on the properties of the blends described in U.S. Pat. No. 3,888,949 by using another heterogeneous catalyst system which is expected to form copolymers which have statistically significant intermolecular and intramolecular compositional differences.

In two successive publications in the journal of *Macromolecules*, 1989, V22, pages 3851–3866, J. W. Collette of E. I. Du Pont has described blends of isotactic polypropylene and partially atactic polypropylene which have desirable tensile elongation properties. However, the partially atactic propylene has a broad molecular weight distribution as shown in FIG. 8 of the first publication. The partially atactic polypropylene is also composed of several fractions, which differ in the level of tacticity of the propylene units as shown by the differences in the solubility in different solvents. This is shown by the corresponding physical decomposition of the blend which is separated by extraction with different solvents to yield individual components of uniform solubility characteristics as shown in Table IV of the above publications.

More recently several authors have shown the formation of more refined structures of partially atactic, partially isotactic polypropylene which have elastomeric properties. It is believed that in these components each molecule consists of portions which are isotactic and therefore crystallizable while the other portions of the same polypropylene molecule are atactic and therefore amorphous. Examples of these propylene homopolymers containing different levels of isotacticity in different portions of the molecule are described by R. Waymouth in U.S. Pat. No. 5,594,080, in the article in the *Journal American Chemical Society* (1995), Vol. 117, page 11586, and in the article in the *Journal American Chemical Society* (1997), Vol. 119, page 3635, J. Chien in the journal article in the *Journal of the American Chemical Society* (1991), Vol. 113, pages 8569–8570; and S. Collins in the journal article in *Macromolecules* (1995) Vol. 28, pages 3771–3778. These articles describe a specific polymer, but do not describe the blends with a more crystalline polymer such as isotactic polypropylene.

In U.S. Pat. Nos. 3,853,969 and 3,378,606, E. G. Kontos discloses the formation of in situ blends of isotactic polypropylene and "stereo block" copolymers of propylene and another olefin of 2 to 12 carbon atoms, including ethylene and hexene. The copolymers of this invention are necessarily heterogeneous in intermolecular and intramolecular composition distribution. This is demonstrated by the synthesis procedures of these copolymers which involve sequential injection of monomer mixtures of different compositions to synthesize polymeric portions of analogously different compositions. In addition, FIG. 1 of both patents shows that the "stereo block" character, which is intra or intermolecular compositional differences in the context of the description of the present invention, is essential to the benefit of the tensile and elongation properties of the blend. Moreover, all of these compositions either do not meet all of the desired properties for various applications, and/or involve costly and burdensome process steps to achieve the desired results.

Similar results are anticipated by R. Holzer and K. Mehnert in U.S. Pat. No. 3,262,992 assigned to Hercules wherein the authors disclose that the addition of a stereoblock copolymer of ethylene and propylene to isotactic polypropylene leads to improved mechanical properties of the blend compared to isotactic polypropylene alone. However, these benefits are described only for the stereoblock copolymers of ethylene and propylene. These copolymers were synthesized by changing the monomer concentrations in the reactor with time. This is shown in examples 1 and 2. The stereoblock character of the polymer is graphically shown in the molecular description (column 2, line 65) and contrasted with the undesirable random copolymer (column 2, line 60). The presence of stereoblock character in these polymers is shown by the high melting point of these polymers and the poor solubility in hydrocarbons at ambient temperature.

There is a need for a polyolefin blend composition which is thermally stable, heat resistant, light resistant and generally suitable for thermoplastic elastomer (TPE) applications which has advantageous processing characteristics. We have found that by blending a crystalline propylene polymer, hereinafter referred to as the "first polymer component, (FPC)" and a crystallizable propylene alpha olefin copolymer polymer, hereinafter referred to as the "second polymer component (SPC)", advantageous processing characteristics result while still providing a composition having decreased flexural modulus and increased tensile strength, elongation, recovery and overall toughness. It is possible to have the addition of a third polymeric component which is another crystallizable propylene alpha olefin copolymer indicated as SPC2 in the text below which has crystallinity intermediate between the FPC and the SPC. The SPC2 also has a narrow composition distribution and is made with a metallocene catalyst. The addition of SPC2 leads to a finer morphology and improvements in some of the properties of the blend of FPC and SPC.

The term "crystalline," as used herein for FPC, characterizes those polymers which possess high degrees of inter- and intra-molecular order, and which melt higher than 110° C. and preferably higher than 115° C. and more preferably higher than 130° C. and preferably have a heat of fusion of at least 75 J/g, as determined by DSC analysis. And, the term "crystallizable," as used herein for SPC describes polymers which are mainly amorphous in the undeformed state, but can crystalize upon stretching or annealing. Crystallization may also be initiated by the presence of a crystalline polymer such as the FPC. These polymers have a melting point of less than 105° C. or preferably less than 100° C. and preferably have a heat of fusion of less than 75 J/g as determined by DSC. SPC2 describes those polymers that are substantially crystalline in the undeformed state. Further crystallization may also occur in the presence of the crystalline polymer such as FPC. These polymers have a melting point of less than 115° C. or preferably less than 100° C. and preferably have a heat of fusion of less than 75 J/g as determined by DSC.

SUMMARY OF THE INVENTION

The present invention is directed to blends with heterophase morphology formed by blending a FPC which is a predominately crystalline stereoregular polypropylene with a SPC which is a crystallizable copolymer of a $C_2$, $C_4$–$C_{20}$ α-olefin (preferably ethylene) and propylene. Optional components of the blend are SPC2, a crystallizable copolymer of a $C_2$, $C_4$–$C_{20}$ α-olefin (preferably ethylene), and process oil. Other optional components are fillers, colorants, antioxidants, nucleators and flow improvers.

The FPC melts higher than 110° C. and preferably higher than 115° C. and more preferably higher than 110° C. and preferably has a heat of fusion of at least 75 J/g, as determined by DSC analysis. The crystalline polypropylene can be either homopolymer or copolymers with other alpha olefins. The FPC may also be comprised of commonly available isotactic polypropylene compositions referred to as impact copolymer or reactor copolymer. However these variations in the identity of the FPC are acceptable in the blend only to the extent that the FPC is within the limitations of the crystallinity and melting point indicated above. The FPC may also contain additives such as flow improvers, nucleators and antioxidants which are normally added to isotactic polypropylene to improve or retain properties. All of these polymers are referred to as the FPC.

The SPC and the SPC2, if used, have stereoregular propylene sequences long enough to crystallize. The SPC has a melting point of less than 105° C. or preferably less than 100° C. and preferably has a heat of fusion of less than 75 J/g. The SPC2 has a melting point of less than 115° C. or preferably less than 100° C. and preferably has a heal of fusion of less than 75 J/g. These stereoregular propylene sequences of SPC and SPC2 should substantially match the stereoregularity of the propylene in the first polymer. For example, if the FPC is predominately isotactic polypropylene, then the SPC, and SPC2 if used, is copolymer having isotactic propylene sequences.

If the FPC is predominately syndiotactic polypropylene, then the SPC, and the SPC2 if used, is a copolymer having syndiotactic sequences. Therefore, SPC and SPC2 have similar, preferably substantially identical, tacticity to the FPC. It is believed that this matching of stereoregularity increases the compatibility of the components and results in improved adhesion at the interface of the domains of the polymers of different crystallinities in the polymer blend composition. Furthermore, good compatibility is only achieved in a narrow range of copolymer composition for the SPC. Narrow intermolecular and intramolecular compositional distribution in the copolymer is preferred. The aforementioned characteristics of the SPC, and SPC2 if used, are preferably achieved by polymerization with a chiral metallocene catalyst.

One preferable embodiment is blending isotactic polypropylene (FPC) with ethylene propylene copolymers (SPC) having about 4 wt. % to about 35 wt. % ethylene (to ensure high compatibility with the FPC). Both the FPC and the SPC have isotactic propylene sequences long enough to crystallize. Resulting blends of isotactic polypropylene with ethylene propylene copolymers according to the invention have improved properties as compared to isotactic polypropylene blends with prior art ethylene propylene rubbers.

A preferred blend comprises 1% to 95% by weight of FPC and a SPC with greater than 65% by weight propylene and preferably greater than 80% by weight propylene.

According to another embodiment, a thermoplastic polymer blend composition of the invention comprises a FPC and a SPC with added process oil.

The FPC comprises isotactic polypropylene, a reactor copolymer or an impact copolymer as described above and is present in an amount of about 1% to about 95% by weight and more preferably 2% to 70% by weight of the total weight of the blend. The balance of the polymer composition consists of a mixture of the process oil and the SPC and SPC2 if used The SPC is a random copolymer of ethylene and propylene having a melting point by DSC of 0° C. to 105° C., preferably in the range 20° C. to 90° C. more preferably in the range of 25° C. to 70° C. and an average propylene content by weight of at least 65% and more preferably at least 80%. This melting point is due to crystallizable propylene sequences, preferrably of isotactic polypropylene. The SPC is made with a polymerization catalyst which forms essentially or substantially isotactic polypropylene, when all or substantially all propylene sequences in the FPC are isotactic. The SPC is statistically random in the distribution of the ethylene and propylene residues along the chain. Quantitative evaluation of the randomness of the distribution of the ethylene and propylene sequences may be obtained by consideration of the experimentally determined reactivity ratios of the second polymer component or by 13 C NMR. This is according to the procedures described in the journal article by H. Kakugo, Y Naito, K. Mizunama and T. Miyatake in Macromolecules (1982), pages 1150–1152. The SPC is made with a single sited metallocene catalyst which allows only a single statistical mode of addition of ethylene and propylene by polymerization in a well mixed, continuous feed stirred tank reactor which provides a uniform polymerization environment for growth of all of the polymer chains of the SPC.

The ratio of the FPC to the SPC of the blend composition of the present invention may vary in the range of 1:99 to 95:5 by weight and more preferably in the range 2:98 to 70:30 by weight.

According to another embodiment of the present invention, the second polymer component may contain small quantities of a non-conjugated diene to aid in the vulcanization and other chemical modification of the blend of the first polymer component and the second polymer component. The amount of diene is preferably less than 10 wt. % and preferably less than 5 wt. %. The diene may be selected from the group consisting of those which are used for the vulcanization of ethylene propylene rubbers and are preferably ethylidene norbornene, vinyl norbornene and dicyclopentadiene.

The SPC2, if used, has the same characteristics as the SPC described above. The SPC2 has a crystallinity and composition intermediate between the FPC and the SPC. In the preferred case where the SPC2 is a copolymer of ethylene and propylene while the FPC is homopolymer of propylene. The SPC2 has the same type of crystallinity of propylene as in the FPC and SPC and an ethylene content in between FPC and SPC. The addition of SPC2 to the blend leads to a better dispersion of the phases in the blend compared to blends of the similar composition which do not have any SPC2. The relative amounts of SPC and SPC2 can vary between 95:5 to 10:90 in the blend. The ratio of the FPC to the sum of SPC and SPC2 may vary in the range of 1:99 to 95:5 by weight and more preferably in the range 2:98 to 70:30 by weight According to still a further embodiment, the invention is directed to a process for preparing thermoplastic polymer blend compositions. The process comprises:

(a) polymerizing propylene or a mixture of propylene and one or more monomers selected from $C_2$ or $C_3$–$C_{20}$ α-olefins in the presence of a polymerization catalyst wherein a substantially isotactic propylene polymer containing at least about 90% by weight polymerized propylene is obtained; (b) polymerizing a mixture of ethylene and propylene in the presence of a chiral metallocene catalyst, wherein a copolymer of ethylene and propylene is obtained comprising up to about 35% by weight ethylene and preferably up to 20% by weight ethylene and containing isotactically crystallizable propylene sequences; and (c) blending the propylene polymer of step (a) with the copolymer of step (b) to form a blend.

The invention is directed to the formation of a blend of the components FPC, SPC and SPC2 which has a heterogeneous phase morphology consisting of domains of different crystallinities. Blends directed to improvement in the elastic recovery have a continuous phase of lower crystallinity and a dispersed phase of the higher crystallinity. The domains of the dispersed phase are small with an average minimum axis less than 5 μm. The larger axis of the dispersed phase can be as large as 100 μm. The dispersed phase consists of a crystalline mixture of FPC with some amount of SPC2 and SPC due to thermodynamic mixing of polymers. The continuous phase consists of the balance of the polymers not included in the dispersed phase. Blends directed to low flexural modulus may have in addition, a heterogeneous phase morphology with continuous phases of lower and greater crystallinity.

Commonly available propylene reactor copolymers consisting of a single phase blend of isotactic polypropylene and copolymers of propylene and ethylene are not included within the scope of the invention since they are a single phase with no prominent dispersed or continuous phases. Polypropylene blends made by a combination of a FPC and a SPC of the present invention that give a heterophase morphology in which the crystalline polymer is the continuous phase in are excluded from the invention.

The benefits of the invention are included improvement in the elastic recovery and the flexural modulus of the blend. These improvements are most apparent as a function of the 500% tensile modulus of the blend. Historically, the examples of the prior art have been able to duplicate the improvements in the blend but only for compositions with a very low 500% tensile modulus

BRIEF DESCRIPTION OF THE DRAWINGS

FIG. 1 shows the morphology of sample H7 in Example 6 below.

FIG. 2 shows the morphology of sample K7 in Example 6 below.

FIG. 3 shows the morphology of sample BB7 in Example 6 below.

FIG. 4 and FIG. 5 show the stress strain elongation data for blends of this invention.

FIG. 6 shows the elastic recovery of annealed/aged blends of this invention.

FIG. 7 shows the elastic recovery of oriented blends of this invention.

FIG. 8 shows the dependence of the flexural modulus of the blend of this invention as a correlated function of the 500% tensile modulus.

DETAILED DESCRIPTION OF THE PREFERRED EMBODIMENTS OF THE INVENTION

Figure 1:
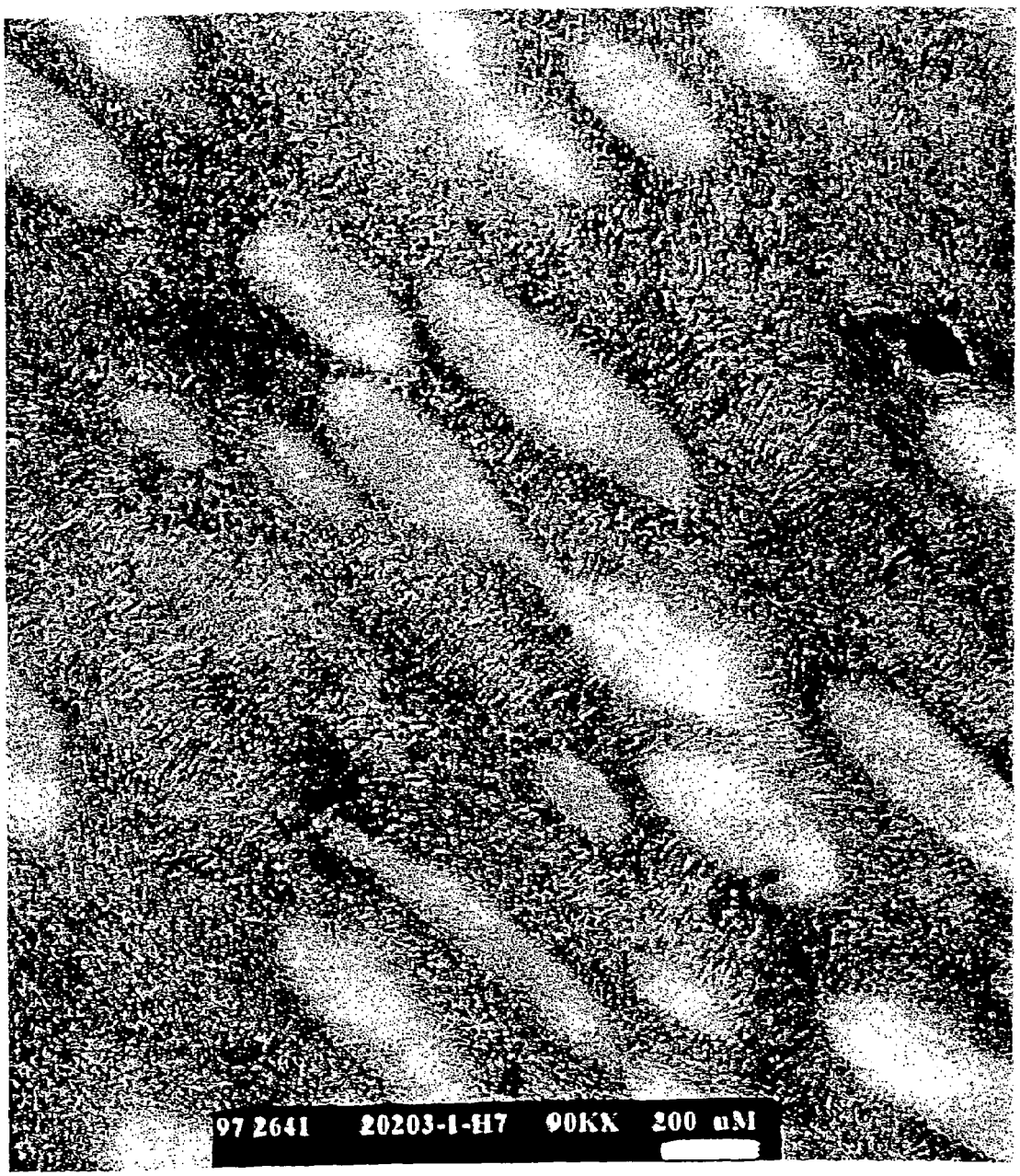
FIG. 1 shows the morphology of a blend of this invention. Specifically.

The blend compositions of the present invention generally are comprised of two components: (1) a crystalline FPC comprising isotactic polypropylene and (2) a crystallizable SPC comprising an alpha-olefin (other than propylene) and propylene copolymer. A particular embodiment of the invention contains a crystallizable SPC2 comprising an alpha-olefin (other than propylene) and propylene copolymer. A particular embodiment of the invention may comprise process oil as an additional component.

The blend also has a heterogeneous phase morphology where a more crystalline polymer mixture consisting essentially of all the FPC and some of the SPC and SPC2 is dispersed in domains in a continuous phase of a less crystalline polymer mixture containing the balance of the blend. The size of the dispersed domains is small and the morphology is stable in the absence of a compatibilizer. Preferably, compositions of the invention are free of, or substantially free of, compatibilizers.

The First Polymer Component (FPC)

In accordance with the present invention, the FPC component i.e., the polypropylene polymer component may be homopolypropylene, or copolymers of propylene, or some mixtures thereof. The FPC has the following characteristics.

(A) The polypropylene of the present invention is predominately crystalline. i.e., it has a melting point generally greater than about 110° C., preferably greater than about 115° C., and most preferably greater than about 130° C. Preferably, it has a heat of fusion greater than 75 J/g.

(B) The polypropylene can vary widely in composition. For example, substantially isotactic polypropylene homopolymer or propylene copolymer containing equal to or less than about 10 weight percent of other monomer, i.e., at least about 90% by weight propylene can be used. Further, the polypropylene can be present in the form of a graft or block copolymer, in which the blocks of polypropylene have substantially the same stereoregularity as the propylene-alpha-olefin copolymer, so long as the graft or block copolymer has a sharp melting point above about 110° C., preferably above 115° C., and more preferably above 130° C., characteristic of the stereoregular propylene sequences. The propylene polymer component may be a combination of homopolypropylene, and/or random, and/or block copolymers as described herein. When the above propylene polymer component is a random copolymer, the percentage of the copolymerized alpha-olefin in the copolymer is, in general, up to about 9% by weight, preferably about 2% to about 8% by weight, most preferably about 2% to about 6% by weight. The preferred alpha-olefins contain 2 or from 4 to about 12 carbon atoms. The most preferred alpha-olefin is ethylene. One or two or more alpha-olefins can be copolymerized with propylene.

Exemplary alpha-olefins may be selected from the group consisting of ethylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

(C) The molecular weight of the FPC can be between 10,000 to 5,000,000 with a polydispersity index (PDI) between 1.5 to 40.0

(D) The thermoplastic polymer blend compositions of the present invention may comprise from about 1% to about 95% by weight of FPC. According to a preferred embodiment, the thermoplastic polymer blend composition of the present invention may comprise from about 2% to about 70% by weight of the FPC. According to the most preferred embodiment, the compositions of the present invention may comprise from about 2% to about 40% by weight of the FPC. An even more preferred embodiment of the invention contains 2% to 25% by weight of FPC in the blend.

There is no particular limitation on the method for preparing this propylene polymer component of the invention. However, in general, the polymer is a propylene homopolymer obtained by homopolymerization of propylene in a single stage or multiple stage reactor. Copolymers may be obtained by copolymerizing propylene and an alpha-olefin having 2 or from 4 to about 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable.

The Second Polymer Component (SPC)

The SPC of the polymer blend compositions of the present invention comprises a crystallizable copolymer of propylene and another alpha-olefin having less than 10 carbon atoms, preferably ethylene. The SPC has the following characteristics:

(A) The SPC of the present invention preferably comprises a random copolymer having a narrow compositional distribution. While not meant to be limited thereby, it is believed that the narrow composition distribution of the second polymer component is important. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is soluble in one or two adjacent fractions with the balance of the polymer in immediately preceding or succeeding fractions. Each of these fractions has a composition (wt. % ethylene content) with a difference of no greater than 20 wt. % (relative) and more preferably 10 wt. % (relative) of the average wt. % ethylene content of the whole second polymer component. The second polymer component is narrow in compositional distribution if it meets the fractionation test outlined above.

(B) In all SPC, the length and distribution of stereoregular propylene sequences is consistent with the substantially random statistical copolymerization. It is well known that sequence length and distribution are related to the copolymerization reactivity ratios. By substantially random, we mean copolymer for which the product of the reactivity ratios is 2 or less. In stereoblock structures, the average length of PP sequences is greater than that of substantially random copolymers with a similar composition. Prior art polymers with stereoblock structure have a distribution of PP sequences consistent with these blocky structures rather than a random substantially statistical distribution. The reactivity ratios and sequence distribution of the polymer may be determined by C-13 NMR which locates the ethylene residues in relation to the neighboring propylene residues. To produce a copolymer with the required randomness and narrow composition distribution, it is desirable to use (1) a single sited catalyst and (2) a well-mixed, continuous flow stirred tank polymerization reactor which allows only a uniform polymerization environment for growth of substantially all of the polymer chains of the second polymer component.

(C) The SPC preferably has a single melting point. The melting point is determined by DSC. Generally, the SPC of the present invention has a melting point between about 105° C. and 0° C. Preferably, the melting point of SPC is between about 90° C. and 20° C. Most preferably, according to one embodiment of the present invention, the melting point of the SPC of the composition of the present invention is between 70° C. and 25° C.

(D) The second polymer component of the present inventive composition comprises crystallizable propylene sequences. The crystallinity of the second polymer component is, preferably, according to one embodiment, from about 1% to about 65% of homoisotactic polypropylene, preferably between 3% to 30%, as measured by the heat of fusion of annealed samples of the polymer.

(E) The molecular weight of the SPC can be between 10,000 to 5,000,000 with a polydispersity index (PDI) between 1.5 to 40.0. The second polymer component preferably has a narrow PDI between about 1.8 to about 5. It is preferred if the SPC has a Mooney Viscosity at 125° C. less than 100, more preferably less than 75 and more preferably less than 60.

(F) The low levels of crystallinity in the SPC are obtained by incorporating from about 5% to about 35% by weight alpha-olefin, preferably from about 6% to about 30% by weight alpha-olefin, and most preferably, it comprises from about 8% to about 25% by weight alpha-olefin and even more preferably between 8% to 20% by alpha-olefin. These composition ranges for the SPC are preferred to obtain the objectives of the present invention. Alpha olefins comprise one or more members of the group $C_2$, $C_4$–$C_{20}$ α-olefin. At alpha-olefin compositions lower than the above lower limits for the composition of the SPC, the blends of the FPC and SPC are thermoplastic and do not have the phase separated morphology required for the tensile recovery properties of the blends. At alpha-olefin compositions higher than the above higher limits for the SPC, the blends have poor tensile strength and a phase separated morphology with a coarse dispersion. It is believed, while not meant to be limited thereby, the SPC needs to have the optimum amount of polypropylene crystallinity to crystallize with the FPC for the beneficial effects of the present invention. As discussed above, the preferred alpha-olefin is ethylene.

(G) The compositions of the present invention may comprise from about 5% to about 99% by weight of the SPC and from about 30% to about 98% by weight of the SPC. Most preferably, they comprise from about 60% to about 98% and even more preferably 75% to 99% by weight of the SPC.

(H) More than one SPC may be used in a single blend with a FPC. Each of the SPC is described above and the number of SPC in this embodiment is less than three and more preferably, two. The different SPC differ in the crystallinity. For two SPC components, the SPC2 is more crystalline than the SPC. The SPC2 has, preferably, according to one embodiment, from about 20% to about 65%, and more preferably between 25% to 65% of the crystallinity of homoisotactic polypropylene as measured by the heat of fusion of annealed samples of the polymer. The SPC and the SPC2 may also differ in their molecular weight. The SPC and SPC2 differ in the alpha-olefin content consistent with the use of two SPC with different crystallinity. The preferred alpha-olefin is ethylene. It is believed that the use of SPC2 in conjunction with a blend of a FPC and a SPC acts as an interfacial agent in these blends. The resultant morphology consists of a finer dispersion of the highly crystalline component with the continuous phase of the less crystalline phase. Such a morphology leads to in the elastic recovery properties of the blends.

The second polymer component may also comprise a copolymer of atactic propylene and isotactic propylene. Such crystallizable homopolymers of propylene have been described by R. Waymouth in U.S. Pat. No. 5,594,080, which is included herein by reference. Optionally, the second component of the composition of the present invention may comprise a diene.

(I) The SPC and the SPC2, if used, have stereoregular propylene sequences long enough to crystallize. These stereoregular propylene sequences of SPC and SPC2 should match the stereoregularity of the propylene in the second polymer. For example, if the FPC is predominately isotactic polypropylene, then the SPC, and SPC2 if used, are copolymers having isotactic propylene sequences. If the FPC is predominately syndiotactic polypropylene, then the SPC, and the SPC2 if used, is a copolymer having syndiotactic sequences. It is believed that this matching of stereoregularity increases the compatibility of the components results in improved adhesion of the domains of the polymers of different crystallinities in the polymer blend composition. Furthermore, good compatibility is only achieved in a narrow range of copolymer composition for the SPC. Narrow intermolecular and intramolecular compositional distribution in the copolymer is preferred. The aforementioned characteristics of the SPC, and SPC2 if used, are preferably achieved by polymerization with a chiral metallocene catalyst.

(J) The SPC is made with a polymerization catalyst which forms essentially or substantially isotactic polypropylene when all or substantially all propylene sequences in the FPC are isotactic. Nonetheless, the polymerization catalyst used for the formation of SPC will introduce stereo and regio-errors in the incorporation of propylene. Stereo errors are those where the propylene inserts in the chain with a tacticity that is not isotactic. A regio error in one where the propylene inserts with the methylene group or the methyldiene group adjacent to a similar group in the propylene inserted immediately prior to it. Such errors are more prevalent after the introduction of an ethylene in the SPC. Thus, the fraction of propylene in isotactic stereoregular sequences (e.g. triads or pentads) is less than 1 for SPC and decreases with increasing ethylene content of the SPC. While not wanting to be constrained by this theory, we suggest that the introduction of these errors in the introduction of propylene, particularly in the presence of increasing amounts of ethylene, are important in the use of these ethylene propylene copolymers as the SPC. Notwithstanding the presence of these errors, the SPC is statistically random in the distribution of ethylene.

(K) The SPC is made with a polymerization catalyst which forms essentially or substantially isotactic polypropylene, when all or substantially all propylene sequences in the FPC are isotactic. The SPC is statistically random in the distribution of the ethylene and propylene residues along the chain. Quantitative sequences may be obtained by consideration of the experimentally determined reactivity ratios of the second polymer component or by 13 C NMR. The SPC is made with a single sited metallocene catalyst which allows only a single statistical mode of addition of ethylene and propylene in a well-mixed, continuous monomer feed stirred tank polymerization reactor which allows only a single polymerization environment for all of the polymer chains of the SPC.

Generally, without limiting in any way the scope of the invention, one means for carrying out a process of the present invention for the production of the copolymer second polymer component is as follows: (1) liquid propylene is introduced in a stirred-tank reactor, (2) the catalyst system is introduced via nozzles in either the vapor or liquid phase, (3) feed ethylene gas is introduced either into the vapor phase of the reactor, or sparged into the liquid phase as is well known in the art, (4) the reactor contains a liquid phase composed substantially of propylene, together with dissolved alpha-olefin, preferably ethylene, and a vapor phase containing vapors of all monomers, (5) the reactor temperature and pressure may be controlled via reflux of vaporizing propylene (autorefrigeration), as well as by cooling coils, jackets, etc. (6) the polymerization rate is controlled by the concentration of catalyst, temperature, and (7) the ethylene (or other alpha-olefin) content of the polymer product is determined by the ratio of ethylene to propylene in the reactor, which is controlled by manipulating the relative feed rates of these components to the reactor.

For example, a typical polymerization process consists of a polymerization in the presence of a catalyst comprising a chiral bis (cyclopentadienyl) metal compound and either 1) a non-coordinating compatible anion activator, or 2) an alumoxane activator. An exemplary catalyst system is described in U.S. Pat. No. 5,198,401 which is herein incorporated by reference for purposes of U.S. practices. The alumoxane activator is preferably utilized in an amount to provide a molar aluminum to metallocene ratio of from about 1:1 to about 20,000:1 or more. The non-coordinating compatible anion activator is preferably utilized in an amount to provide a molar ratio of biscyclopentadienyl metal compound to non-coordinating anion of 10:1 to about 1:1. The above polymerization reaction is conducted by reacting such monomers in the presence of such catalyst system at a temperature of from about −50° C. to about 200° C. for a time of from about 1 second to about 10 hours to produce a copolymer having a weight average molecular weight of from about 5,000 or less to about 1,000,000 or more and a molecular weight distribution of from about 1.8 to about 4.5.

While the process of the present invention includes utilizing a catalyst system in the liquid phase (slurry, solution, suspension or bulk phase or combination thereof), gas phase polymerization can also be utilized. When utilized in a gas phase, slurry phase or suspension phase polymerization, the catalyst systems will preferably be supported catalyst systems. See, for example, U.S. Pat. No. 5,057,475 which is incorporated herein by reference for purposes of U.S. practice. Such catalyst systems can also include other well-known additives such as, for example, scavengers. See, for example, U.S. Pat. No. 5,153,157 which is incorporated herein by reference for purposes of U.S. practices. These processes may be employed without limitation of the type of reaction vessels and the mode of conducting the polymerization. As stated above, and while it is also true for systems utilizing a supported catalyst system, the liquid phase process comprises the steps of contacting ethylene and propylene with the catalyst system in a suitable polymerization diluent and reacting the monomers in the presence of the catalyst system for a time and at a temperature sufficient to produce an ethylene-propylene copolymer of the desired molecular weight and composition.

Process Oil

Process oil can be optimally added to the polymer blend compositions of the present invention. The addition of process oil in moderate amounts lowers the viscosity and flexibility of the blend while improving the properties of the blend at temperatures near and below 0ûC. It is believed that these benefits arise by the lowering of the Tg of the blend comprising the mixture of the FPC and the SPC. Additional benefits of adding process oil to the blend of the FPC and the SPC include improved processability and a better balance of elastic and tensile strength are anticipated.

The process oil is typically known as extender oil in the rubber application practice. The process oils can consist of (a) hydrocarbons consisting of essentially of carbon and hydrogen with traces of heteroatoms such as oxygen or (b) essentially of carbon, hydrogen and at least one heteroatom such as dioctyl phthalate, ethers and polyethers. The process oils have a boiling point to be substantially involatile at 200° C. These process oils are commonly available either as neat solids or liquids or as physically absorbed mixtures of these materials on an inert support (e.g. clays, silica) to form a free flowing powder. We believe that all forms of these process oils are equally applicable to the description and the practice of the invention.

The process oils usually include a mixture of a large number of chemical compounds which may consist of linear, acyclic but branched, cyclic and aromatic carbonaceous structures. Another family of process oils are certain low to medium molecular weight (Molecular weight ($M_n$)<10,000) organic esters and alkyl ether esters. Examples of process oils are Sunpar® 150 and 220 from The Sun Manufacturing Company of Marcus Hook, Pa., USA and Hyprene V750 and Hyprene V1200 from Ergon, Post Office Box 1639, Jackson, Miss. 39215-1639, USA. and IRM 903 from Calumet Lubricants Co., 10234 Highway 157, Princeton, La. 71067-9172, USA. It is also anticipated that combinations of process oils each of which is described above may be used in the practice of the invention. It is important that in the selection of the process oil be compatible or miscible with the polymer blend composition of the FPC and the SPC in the melt to form a homogenous one phase blend. It is also preferred if the process oil is substantially miscible in the SPC at room temperature.

The addition of the process oils to the mixture comprising the FPC and the SPC maybe made by any of the conventional means known to the art. These include the addition of all or part of the process oil prior to recovery of the polymer as well as addition of the process oil, in whole or in part, to the polymer as a part of a compounding for the interblending of the FPC and the SPC. The compounding step may be carried out in a batch mixer such as a mill or an internal mixer such as Banbury mixer. The compounding operation may also be conducted in a continuous process such as a twin screw extruder.

The addition of certain process oils to lower the glass transition temperature of blends of isotactic polypropylene and ethylene propylene diene rubber has been described in the art by Ellul in U.S. Pat. Nos. 5,290,886 and 5,397,832. We expect these procedures are easily applicable to the FPC and SPC mixtures of the current invention.

The FPC and SPC physical mixture may include process oil in the range of from about 1 to about 200, preferably in the range of from about 2 to 50 parts by weight of process oil per hundred parts of total polymer (FPC plus SPC).

The Blend of First and Second Polymer Components

The blends of FPC and SPC and other components may be prepared by any procedure that guarantees an intimate mixture of the components. For example, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation about 10 times. Internal mixers are particularly useful for solution or melt blending. Blending at a temperature of about 180° C. to 240° C. in a Brabender Plastograph for about 1 to 20 minutes has been found satisfactory. Still another method that may be used for admixing the components involves blending the polymers in a Banbury internal mixer above the flux temperature of all of the components, e.g., 180° C. for about 5 minutes. A complete mixture of the polymeric components is indicated by the uniformity of the morphology of the dispersion of FPC and SPC. Continuous mixing may also be used. These processes are well known in the art and include single and twin screw mixing extruders, static mixers for mixing molten polymer streams of low viscosity, impingement mixers, as well as other machines and processes, designed to disperse the first polymer component and the second polymer component in intimate contact.

The polymer blends of the instant invention exhibit a remarkable combination of desirable physical properties. The incorporation of as little as 5% FPC in the SPC composed of propylene/alpha-olefin copolymers increases the melting point of the blend. In addition, the incorporation of FPC in accordance with the instant invention nearly eliminates the stickiness characteristic of the propylene/alpha-olefin copolymer alone.

The mechanism by which the desirable characteristics of the present copolymer blends are obtained is not fully understood. However, it is believed to involve a co-crystallization phenomenon between propylene sequences of similar stereoregularity in the various polymeric components, which results in a narrowing of the differences in the crystallization temperature of the blend components The combined first polymer component and second polymer component have a blend melting point closer together than would be expected on a comparison of the properties of the individual components alone. Surprisingly, some blend compositions have a single crystallization temperature and a single melting temperature, since it would be expected by those skilled in the art that the blending of two crystalline polymers would result in a double crystallization temperature as well as a double melting temperature reflecting the two polymeric components. However, the intimate blending of the polymers having the required crystallinity characteristics apparently results in a crystallization phenomenon that modifies the other physical properties of the propylene/alpha-olefin copolymer, thus measurably increasing its commercial utility and range of applications.

While the above discussion has been limited to the description of the invention in relation to having only components one and two, as will be evident to those skilled in the art, the polymer blend compositions of the present invention may comprise other additives. Various additives may be present to enhance a specific property or may be present as a result of processing of the individual components. Additives which may be incorporated include, for example, fire retardants, antioxidants, plasticizers, pigments, vulcanizing or curative agents, vulcanizing or curative accelerators, cure retarders, processing aids, flame retardants, tackifying resins, and the like. These compounds may include fillers and/or reinforcing materials. These include carbon black, clay, talc, calcium carbonate, mica, silica, silicate, combinations thereof, and the like. Other additives which may be employed to enhance properties include antiblocking agents, coloring agent. Lubricants, mold release agents, nucleating agents, reinforcements, and fillers (including granular, fibrous, or powder-like) may also be employed. Nucleating agents and fillers tend to improve rigidity of the article. The list described herein is not intended to be inclusive of all types of additives which may be employed with the present invention. Upon reading this disclosure, those of skill in the art will appreciate other additives may be employed to enhance properties of the composition. As is understood by the skilled in the art, the polymer blend compositions of the present invention may be modified to adjust the characteristics of the blend as desired.

Morphology of the Blend

The morphology of the blend is shown in Transmission Electron Microscopy of the blends. In this procedure samples were exposed to vapors of 1% aqueous $RuO_4$ for 3 days. The $RuO_4$ penetrates the amorphous zones of the continuous, less crystalline phase of the polymer while the more crystalline domains composed largely of the FPC are essentially unaffected. Within the continuous zone the $RuO_4$ stained the microzones of amorphous polymer while the lamellae of crystalline polymer are visible by contrast. The blend was cryomicrotomed at −196° C. to thin sections approximately 0.3 to 3 µm thick. Several sections were analyzed for each sample until a section was found where the crystalline domains was unstained while the continuous phase was stained to distinguish it from the dispersed phase and to observe the microstructure of the lamellae of polymer.

Figure 2:
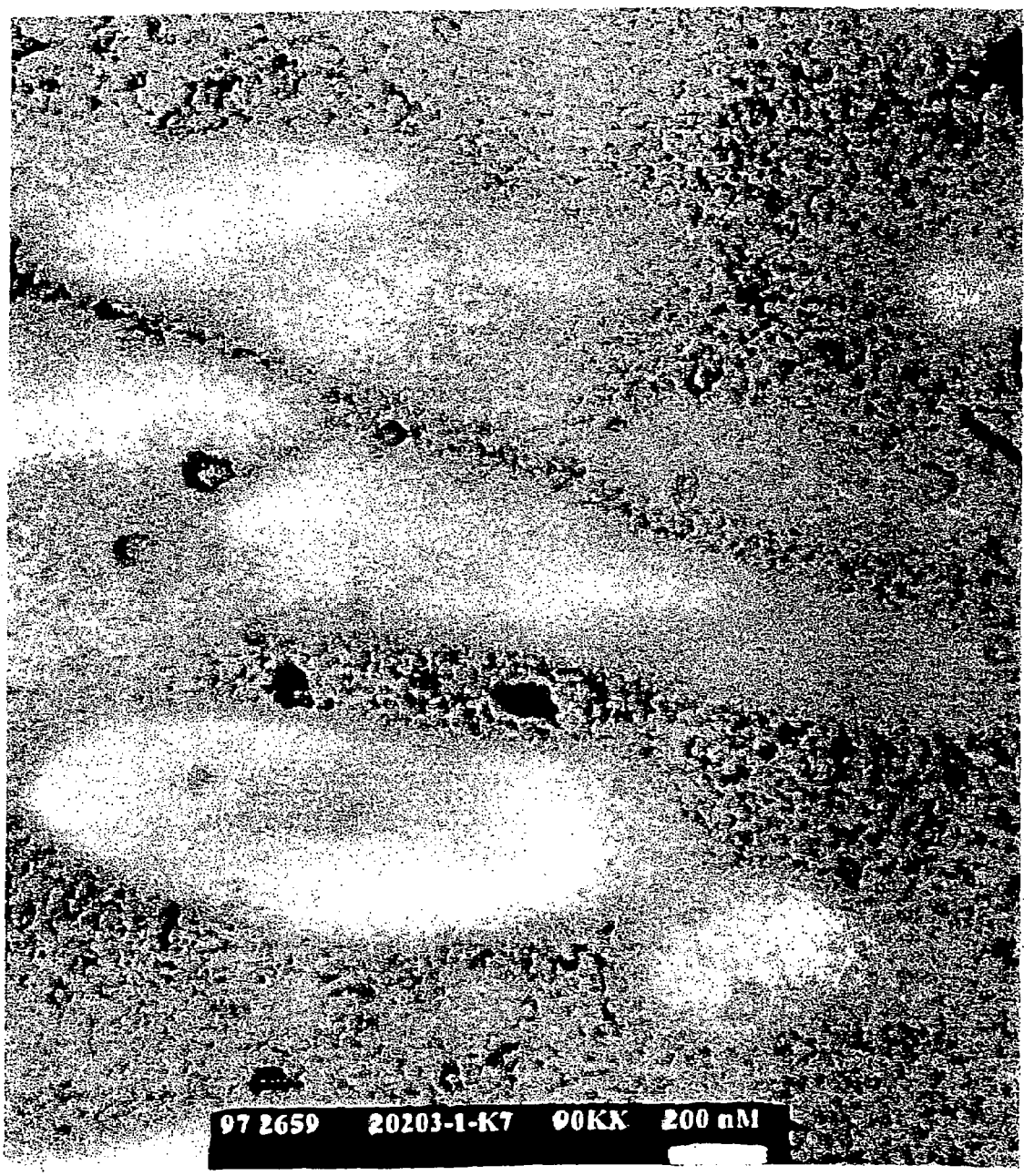
FIG. 2 shows the morphology of a blend of this invention. Specifically.
Figure 3:
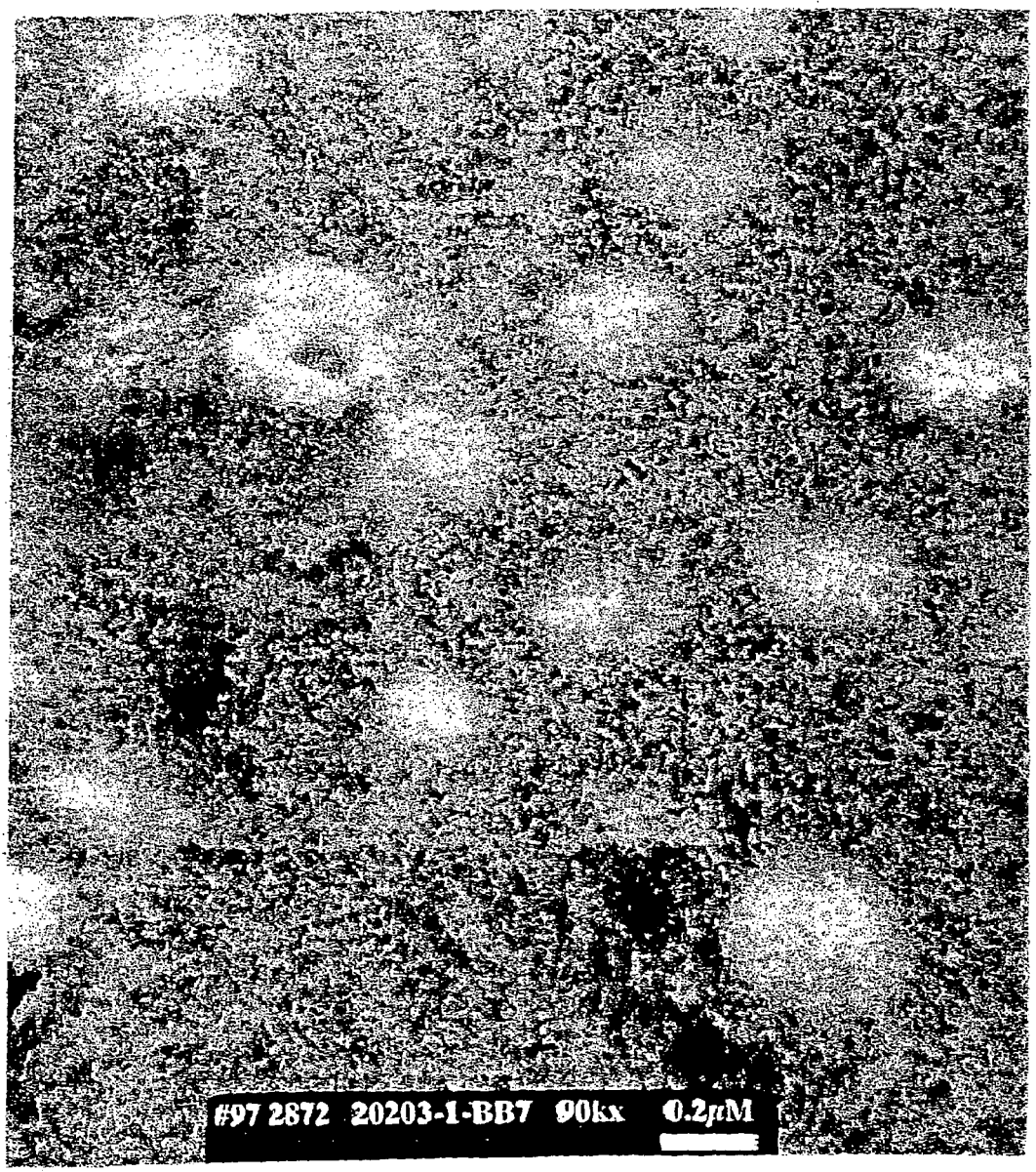
FIG. 3 shows the morphology of a blend of this invention which includes SPC2. Specifically.

The blends of the current invention with good elastic recovery from tensile deformation had a microstructure with clearly dispersed microdomains of the crystalline phase. This is shown in FIG. 1. The composition and elastic recovery properties of the blend is shown as H7 in the Tables below. The domains are elongated with approximate dimensions of 0.2 µm×1 µm. FIG. 2 shows a different blend of the invention, designated as K7 in the Tables below, with the dispersed phase having dimensions of 0.6 µm×2.0 µm. The addition of SPC2 to this blend is shown in the micrograph BB7 (FIG. 3) shows the reduction in the size of the dispersed phase to elongated particles having 0.2 µm for each dimension. SPC2 is therefore believed to act as an agent for reducing the size of the dispersion of the crystalline phases in the dispersed continuous phase. This is the morphological effect of adding SPC2 to the blend of a FPC and SPC.

Properties of the blend: Elongation

The blends of the current invention have tensile elongation in excess of 700%. This elongation is determined for blends at 20 in/min according to the procedure described in ASTM D790. The data is reported in engineering units with no correction to the stress for the lateral contraction in the specimen due to tensile elongation.

The stress-strain elongation properties of the insitu and the corresponding physical blends was evaluated using dumbbell shaped sample. The samples were compression molded at 180° C. to 200° C. for 15 minutes at a force of 15 tons into a plaque of dimensions of 6 in×6 in. The cooled plaques were removed and the specimens were removed with a die. The stress strain evaluation of the samples was conducted on an Instron 4465 tester, made by Instron Corporation of 100 Royall Street, Canton, Mass. The digital data was collected in a file collected by the Series IX Material Testing System available from Instron Corporation and analyzed using Excel 5, a spreadsheet program available from Microsoft Corporation of Redmond, Wash.

FIG. 4 and FIG. 5 show the stress strain elongation data for blends containing one FPC and one SPC or two SPC respectively.

Properties of the Blend: Elastic Recovery

The benefit of the above invention is that compositions comprising the FPC and the SPC optionally containing SPC2 and/or amounts of process oil can be made which have excellent elastic recovery from tensile deformation. These elastic blends have a morphology of containing a crystalline phase dispersed in the continuous crystallizable phase. The dispersed crystalline phase contains the majority of the FPC and some of the SPCs due to thermodynamic mixing while the continuous phase consists of the balance of the polymer blend. Elastic recovery from tensile deformation is a tension set from 200% extension of less than 40%, more preferably less than 25% and more preferably less than 15%.

These values of the tension set over the range of composition of the FPC and SPC are dependent on the 500% tensile modulus. Elastic recovery of the blend is judged on two criteria: (a) extensibility to 500% elongation with a measurable modulus and (b) tension set from an extension to 200% elongation. Comparative blends often cannot be extended to 500% extension for evaluation of the 500% modulus and, thus, cannot be compared to the blends of the current invention. Some comparative blends in the prior art can be extended to 500% elongation for the measurement of tensile modulus but have poor elastic recovery from a 200% extension. The elastic blends of the current invention fulfill both of these conditions. Generally for all blends the tension set deteriorates with increase in the 500% tensile modulus. Thus tension set from a 200% extension is judged relative to the tensile modulus of the blend for a 500% extension. The blends of the current invention have better elastic recovery, as indicated by low tension set, than blends of the comparative blends at comparable 500% tensile modulus. These properties are available over a wide range of composition and relative amounts of the FPC and the SPC. These compositions also have a range of tensile strength from 300 psi to 5000 psi. In the examples shown below, we show examples of numerous blends of composition of the FPC and the SPC which have the above favorable combination of properties.

In one embodiment, the composition of the invention has a tension set from 200% extension equal to or less than 0.02M+5, preferably equal to or less than 0.0108M+3, more preferably equal to or less than 0.0052M+2, wherein M is 500% modulus expressed in lbs/inch$^2$.

It is possible to generate comparative polymer blends with some aspect of the combined 500% tensile modulus and 200% tension set properties of the blends of this invention approached if the SPCs are of extremely high molecular weight and in the limit crosslinked. Such a combination would lead to blends which had very poor processing characteristics since they would tend to melt fracture. It is understood that those polymer blends are directed to easy processing materials that can be handled in conventional thermoplastics processing machinery.

Another part of the invention is that the elastic recovery referred to above can be enhanced by the thermal annealing of the polymer blends or by the orientation of articles made from these polymer blends. Thermal annealing of the polymer blend is conducted by maintaining the polymer blends or the articles made from a such a blend at temperature between room temperature to a maximum of 160° C. or more preferably to a maximum of 130° C. for a period between 5 minutes to less than 7 days. A typical annealing period is 3 days at 50° C. or 5 minutes at 100° C. The annealing time and temperature can be adjusted for any particular blend composition comprising a FPC and one or two SPC by experimentation. It is believed that during this annealing process, there is intermolecular rearrangement of the polymer chains, leading to a material with much greater recovery from tensile deformation than the unannealed material. The elastic recovery of annealed/aged blends of this invention is shown in FIG. 6.

Another part of the invention is that the mechanical properties referred to above can be enhanced by the mechanical orientation of the polymer blend. Mechanical orientation can be done by the temporary, forced extension of the polymer blend along one or more axis for a short period of time before it is allowed to relax in the absence of the extensional forces. It is believed that the mechanical orientation of the polymer leads to reorientation of the crystallizable portions of the blend of the first and the second polymer. Oriented polymer blends is conducted by maintaining the polymer blends or the articles made from a such a blend at an extension of 10% to 400% for a period of 0.1 seconds to 24 hours. A typical orientation is an extension of 200% for a momentary period at room temperature. The elastic recovery of oriented blends of this invention is shown in FIG. 7.

In one embodiment, articles can contain the composition of the invention after the composition has been oriented, and wherein the tension set from 200% extension equal to or less than 0.011 M+3, preferably equal to or less than 0.0057M+2, more preferably equal to or less than 0.0035M+1, wherein M is 500% modulus expressed in lbs/inch$^2$.

Annealing and orientation of the blend of the FPC and SPC lead to improvement in the tensile recovery properties of the blend. This is shown in the data in Tables below where the tension set recovery values for the blends described in the invention are described for the blends as made, after annealing and after orientation as described in the procedures above. The data show that the elastic recovery properties are enhanced.

Properties of the Blend: Flexural Modulus

The benefit of the above invention is that compositions comprising the FPC and the SPC containing optional amounts of process oil can be made which have low flexural modulus. These blends have a crystalline phase dispersed in the continuous crystallizable phase. The crystalline phase contains the majority of the FPC and some of the SPCs due to thermodynamic mixing while the continuous phase consists of the balance of the polymer blend. Low flexural modulus is a 1% secant modulus less than 60 kpsi in/in, more preferably less than 30 kpsi in/in and more preferably less than 15 kpsi in/in These values of the flexural modulus over the range of composition of the FPC and SPC are dependent on the 500% tensile modulus. Flexural modulus of the blend is judged on two criteria: (a) extensibility to 500% elongation with a measurable modulus and (b) 1% secant flexural modulus. Comparative blends often cannot be extended to 500% extension for evaluation of the 500% modulus and thus cannot be compared to the blends of the current invention. The flexible blends of the current invention fulfill both of these conditions. Generally for all blends the flexural modulus deteriorates with increase in the 500% tensile modulus. Thus flexural modulus is judged relative to the tensile modulus of the blend for a 500% extension. The blends of the current invention have a lower flexural modulus, as indicated by low tension set, than blends of the comparative blends at comparable 500% tensile modulus. These properties are available over a wide range of composition and relative amounts of the FPC and the SPC. In the examples shown below we show examples of numerous blends of composition of the FPC and the SPC which have the above favorable combination of properties.

The dependence of the flexural modulus of the blend of this invention as a correlated function of the 500% tensile modulus is shown FIG. 8.

In one embodiment, the composition of the invention has a flexural modulus in kpsi.in/in equal to or less than 0.013M−1.3, preferably equal to or less than 0.0083M−1.6, more preferably equal to or less than 0.0062M−2.5 wherein M is 500% modulus expressed in lbs/inch$^2$.

In another embodiment, articles can contain the composition of the invention after the composition has been oriented, and wherein the flexural modulus in kpsi.in/in equal to or less than 0.013M−1.3, preferably equal to or less than 0.0083M−1.6, more preferably equal to or less than 0.0062M−2.5 wherein M is 500% modulus expressed in lbs/inch$^2$.

As used herein, Mooney Viscosity was measured as ML (1+4) at 125° C. in Mooney units according to ASTM D1646.

The composition of Ethylene propylene copolymers, which are used as comparative examples, was measured as ethylene Wt. % according to ASTM D 3900.

The composition of the second polymer component was measured as ethylene Wt. % according to the following technique. A thin homogeneous film of the second polymer component, pressed at a temperature of about or greater than 150° C. was mounted on a Perkin Elmer PE 1760 infra red spectrophotometer. A full spectrum of the sample from 600 cm−1 to 400 cm−1 was recorded and the ethylene Wt. % of the second polymer component was calculated according to Equation 1 as follows:

$$\text{ethylene Wt. \%} = 82.585 - 111.987X + 30.045X^2$$

wherein X is the ratio of the peak height at 1155 cm$^{-1}$ and peak height at either 722 cm$^{-1}$ or 732 cm$^{-1}$, which ever is higher.

Techniques for determining the molecular weight (Mn and Mw) and molecular weight distribution (MWD) are found in U.S. Pat. No. 4,540,753 (Cozewith, Ju and Verstrate) (which is incorporated by reference-herein for purposes of U.S. practices) and references cited therein and in Macromolecules, 1988, volume 21, p 3360 (Verstrate et al) (which is herein incorporated by reference for purposes of U.S. practice) and references cited therein.

The procedure for Differential Scanning Calorimetry is described as follows. About 6 to 10 mg of a sheet of the polymer pressed at approximately 200° C. to 230° C. is removed with a punch die. This is annealed at room temperature for 240 hours. At the end of this period, the sample is placed in a Differential Scanning Calorimeter (Perkin Elmer 7 Series Thermal Analysis System) and cooled to about −50° C. to about −70° C. The sample is heated at 20° C./min to attain a final temperature of about 200° C. to about 220° C. The thermal output is recorded as the area under the melting peak of the sample which is typically peaked at about 30° C. to about 175° C. and occurs between the temperatures of about 0° C. and about 200° C. is measured in Joules as a measure of the heat of fusion. The melting point is recorded as the temperature of the greatest heat absorption within the range of melting of the sample. Under these conditions, the melting point of the second polymer component and the heat of fusion is lower than the first polymer component as outlined in the description above.

Composition distribution of the second polymer component was measured by the thermal fractionation as described below. About 30 gms of the second polymer component was cut into small cubes about ⅛" on the side. This is introduced into a thick walled glass bottle closed with screw cap along with 50 mg of Irganox1076, an antioxidant commercially available from Ciba-Geigy Corporation. Then, 425 ml of hexane (a principal mixture of normal and isomers) is added to the contents of the bottle and the sealed bottle is maintained at about 23° C. for 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the second polymer component soluble at 40° C., 48° C., 55° C. and 62° C. are obtained at temperature increases of approximately 8° C. between stages. Further, increases in temperature to 95° C. can be accommodated, if heptane, instead of hexane, is used as the solvent for all temperatures above about 60° C. The soluble polymers are dried, weighed and analyzed for composition, as wt. % ethylene content, by the IR technique described above. Soluble fractions obtained in the adjacent temperature increases are the adjacent fractions in the specification above.

Comparative data was obtained with EPR which is Vistalon 457, sold by the Exxon Chemical Company, Houston Tex.

Blends were made by mixing a total of 72 g of all components, including the first polymer component, the second polymer component, the optional amounts of process oil and other ingredients in a Brabender intensive mixture for 3 minutes at a temperature controlled to be within 185° C. and 220° C. High shear roller blades were used for the mixing and approximately 0.4 g of Irganox-1076, an antioxidant available from the Novartis Corporation, was added to the blend. At the end of the mixing, the mixture was removed and pressed out into a 6"×6" mold into a pad 025" thick at 215° C. for 3 to 5 minutes. At the end of this period, the pad was cooled and removed and allowed to anneal for 1 day. Test specimens of the required dumbbell geometry were removed from this pad and evaluated on an Instron 4465 tester equipped with Instron Series IX Software for Windows to produce the mechanical deformation data. The Instron Tester and associated equipment is available form The Instron Corporation in Canton, Mass. The testing was done at a travel rate of 20"/min and all data is reported in engineering stress and strain term with values of the stress uncorrected for the contraction in the cross section of the sample being tested.

Samples were aged by allowing them to stand at room temperature prior to testing. Samples were aged for 5, 10, 15, 20 and 25 days prior to testing on the Instron. Significant difference in the tensile strength and tension set were observed between samples aged 1 days versus those aged for 5 or more days. There was no experimental difference between samples aged 5 days or longer.

Samples were oriented by momentarily extending them to 200% extension at room temperature. These oriented samples were retested under tensile testing conditions outlined above. Tension set was determined on the samples of the blend which has been extended on the Instron tester to 200% extension and then allowed to relax. The samples were removed and the length (L2) of the deformation zone, between the grips on the Instron tester, was measured after 10 minutes. The original distance between the rips was the original length (L1) of the deformation zone. The tension set (TSet) is given by the formula $$Tset=100*(L2-L1)/L1$$

Flexural modulus was determined for samples of the blend by ASTM procedure D790 at room temperature.

The invention, while not meant to be limited thereby, is further illustrated by the following specific examples:

EXAMPLES

Example 1

Ethylene/Propylene Copolymerization to Form the Second Polymer Component

Continuous Polymerization of the SPC was conducted in a 9 liter Continuous Flow Stirred Tank Reactor using hexane as the solvent. The liquid full reactor had a residence time of 9 minutes and the pressure was maintained at 700 kpa. A mixed feed of Hexane, ethylene and propylene was pre-chilled to approximately −30° C. to remove the heat of polymerization, before entering the reactor. Solution of catalyst/activator in Toluene and the scavenger in hexane were separately and continuously admitted into the reactor to initiate the polymerization. The reactor temperature was maintained between 35 and 50 C, depending on the target molecular weight. The feed temperature was varied, depending on the polymerization rate to maintain a constant reactor temperature. The polymerization rate was varied from about 0.5 Kg/hr to about 4 Kg/hr.

Hexane at 30 Kg/hr was mixed with ethylene at 717 g/hr and propylene at 5.14 Kg/hr and fed to the reactor. The polymerization catalyst, dimethyl silyl bridged bis-indenyl Hafnium dimethyl activated 1:1 molar ratio with N',N'-Dimethyl anilinium-tetrakis(pentafluorophenyl)borate was introduced at the rate of at 0.0135 g/hr. A dilute solution of triisobutyl aluminum was introduced into the reactor as a scavenger of catalyst terminators: a rate of approximately 111 mole of scavenger per mole of catalyst was adequate for this polymerization. After five residence times of steady polymerization, a representative sample of the polymer produced in this polymerization was collected. The solution of the polymer was withdrawn from the top, and then steam distilled to isolate the polymer. The polymerization rate was measured at 3.7 Kg/hr. The polymer produced in this polymerization had an ethylene content of 14%, ML (1+4) 125C of 13.1 and had isotactic propylene sequences.

Variations in the composition of the polymer were obtained principally by changing the ratio of ethylene to propylene. Molecular weight of the polymer was varied by either changing the reactor temperature or by changing the ratio of total monomer feed rate to the polymerization rate. Dienes for terpolymerization were added to the mixed feed stream entering the reactor by preparing the diene in a hexane solution and metering it in the required volumetric amount.

Example 2

Comparative Ethylene/Propylene Polymerization where the Propylene Residues are Atactic Polymerizations were conducted in a 1 liter thermostated continuous feed stirred tank reactor using hexane as the solvent. The polymerization reactor was full of liquid. The residence time in the reactor was typically 7–9 minutes and the pressure was maintained at 400 kpa. Hexane, ethene and propene were metered into a single stream and cooled before introduction into the bottom of the reactor. Solutions of all reactants and polymerization catalysts were introduced continuously into the reactor to initiate the exothermic polymerization. Temperature of the reactor was maintained at 45° C. by changing the temperature of the hexane feed and by using cooling water in the external reactor jacket. For a typical polymerization, the temperature of feed was about −10° C. Ethene was introduced at the rate of 45 gms/min and propene was introduced at the rate of 310 gms/min. The polymerization catalyst, dimethyl silyl bridged (tetramethylcyclopentadienyl) cyclododecylamido titanium dimethyl activated 1:1 molar ratio with N',N'-Dimethyl anilinium-tetrakis(pentafluorophenyl)borate was introduced at the rate of 0.002780 gms/hr. A dilute solution of triisobutyl aluminum was introduced into the reactor as a scavenger of catalyst terminators: a rate of approximately 36.8 mole per mole of catalyst was adequate for this polymerization. After five residence times of steady polymerization, a representative sample of the polymer produced in this polymerization was collected. The solution of the polymer was withdrawn from the top, and then steam distilled to isolate the polymer. The rate of formation of the polymer was 258 gms/hr. The polymer produced in this polymerization had an ethylene content of 14.1 wt. %, ML@125 (1+4) of 95.4.

Variations in the composition of the polymer were obtained principally by changing the ratio of ethene to propene. Molecular weight of the polymer could be increased by a greater amount of ethene and propene compared to the amount of the polymerization catalyst. These polymers are described as aePP in the Tables below.

Example 3

Analysis and Solubility of Several Second Polymer Components

In the manner described in Example 1 above, several second polymer components of the above specification were synthesized. These are described in the table below. Table 1 describes the results of the GPC, composition, ML and DSC analysis for the polymers.

TABLE 1

Table 1: Analysis of the second polymer component and the comparative polymers

| SPC | (Mn) by GPC | (Mw) by GPC | Ethylene wt. % by IR | Heat of fusion J/g | Melting Point by DSC (° C.) | ML (1 + 4)@125° C. |
|---|---|---|---|---|---|---|
| SPC-1 | 102000 | 248900 | 7.3 | 71.9 | 84.7 | 14 |
| SPC-2 | | | 9.4 | 30.2 | 65.2 | 27.8 |
| SPC-3 | 124700 | 265900 | 11.6 | 17.1 | 43.0 | 23.9 |
| SPC-4 | | | 12.8 | 16.4 | 42.5 | |
| SPC-5 | | | 14.7 | 13.2 | 47.8 | 38.4 |
| SPC-6 | 121900 | 318900 | 16.4 | 7.8 | 40.3 | 33.1 |
| SPC-7 | | | 17.8 | 5.3 | 39.5 | |
| Comparative Polymers | | | | | | |
| EPR | | | 47.8 | not detected | not detected | 40 |
| AePP | | | 11.7 | not detected | not detected | 23 |

Table 2 describes the solubility of the second polymer component

TABLE 2

Table 2: Solubility of fractions of the second polymer component. Sum of the fractions add up to slightly more than 100 due to imperfect drying of the polymer fractions.

| SPC | Wt. % soluble at 23° C. | Wt. % soluble at 31° C. | Wt. % soluble at 40° C. | Wt. % soluble at 48° C. |
|---|---|---|---|---|
| SPC-1 | 1.0 | 2.9 | 28.3 | 68.5 |
| SPC-3 | 6.5 | 95.7 | | |
| SPC-6 | 51.6 | 52.3 | 2.6 | |
| SPC-5 | 36.5 | 64.2 | | |
| Comparative Polymers | | | | |
| EPR | 101.7 | | | |
| aePP | 100.5 | | | |

Table 3 describes the composition of the fractions of the second polymer component obtained in Table 2. Only fractions which have more than 4% of the total mass of the polymer have been analyzed for composition.

TABLE 3

Table 3: Composition of fractions of the second polymer component obtained in Table 2. The experimental inaccuracy in determination of the ethylene content is believed to about 0.4 wt. % absolute.

| | Composition: Wt. % ethylene in fraction | | | | |
|---|---|---|---|---|---|
| SPC | soluble at 23° C. | soluble at 31° C. | soluble at 40° C. | soluble at 48° C. | soluble at 56° C. |
| SPC-1 | | | | 8.0 | 7.6 |
| SPC-3 | 12.0 | 11.2 | | | |
| SPC-6 | 16.8 | 16.5 | | | |
| SPC-5 | 14.9 | 14.6 | | | |
| Comparative | | | | | |
| EPR | 46.8 | | | | |
| Atactic ePP | 11.8 | | | | |

Example 4

Blends were made in all composition of Table 4 according to the procedure described above.

TABLE 4

Flexural Modulus, Tensile Modulus and Tension set for Binary Blends of one FPC and one SPC as molded

| Sample | Wt % SPC1 | ML of SPC1 | C2 Wt. % of SPC1 | 500% Modulus (psi) | 500% Modulus (MPa) | 100% Modulus (psi) | 100% Modulus (Mpa) | Flexural modulus (kpsi in/in) | (MPa) cm/cm |
|---|---|---|---|---|---|---|---|---|---|
| F6 | 66.7 | 11.5 | 12.4 | 1778 | 12.26 | 1168 | 8.05 | | |
| F7 | 77.8 | 11.5 | 12.4 | 1442 | 9.94 | 813 | 5.61 | | |
| F8 | 88.9 | 11.5 | 12.4 | 1077 | 7.43 | 575 | 3.96 | | |
| F9 | 100 | 11.5 | 12.4 | 971 | 6.69 | 471 | 3.25 | | |
| G6 | 66.7 | 18.3 | 12.1 | 1800 | 12.41 | 1138 | 7.85 | | |
| G7 | 77.8 | 18.3 | 12.1 | 1446 | 9.97 | 741 | 5.11 | | |
| G8 | 88.9 | 18.3 | 12.1 | 1089 | 7.51 | 538 | 3.71 | | |
| G9 | 100 | 18.3 | 12.1 | 979 | 6.75 | 472 | 3.25 | | |

TABLE 4-continued

Flexural Modulus, Tensile Modulus and Tension set for Binary Blends of one FPC and one SPC as molded

| Sample | Wt % SPC1 | ML of SPC1 | C2 Wt. % of SPC1 | 500% Modulus (psi) | 500% Modulus (MPa) | 100% Modulus (psi) | 100% Modulus (Mpa) | Flexural modulus (MPa kpsi in/in) | (MPa cm/cm) |
|---|---|---|---|---|---|---|---|---|---|
| H6 | 66.7 | 25.3 | 12.0 | 1969 | 13.58 | 1216 | 8.38 | 18.1 | 0.12 |
| H7 | 77.8 | 25.3 | 12.0 | 1591 | 10.97 | 879 | 6.06 | 10.1 | 0.07 |
| H8 | 88.9 | 25.3 | 12.0 | 1254 | 8.65 | 664 | 4.58 | 5.5 | 0.04 |
| H9 | 100 | 25.3 | 12.0 | 1127 | 7.77 | 552 | 3.81 | 3.8 | 0.03 |
| J6 | 66.7 | 39.7 | 13.4 | 1495 | 10.31 | 977 | 6.74 | | |
| J7 | 77.8 | 39.7 | 13.4 | 1394 | 9.61 | 754 | 5.20 | | |
| J8 | 88.9 | 39.7 | 13.4 | 904 | 6.23 | 452 | 3.12 | | |
| J9 | 100 | 39.7 | 13.4 | 751 | 5.18 | 320 | 2.21 | | |
| K5 | 55.6 | 28.9 | 14.8 | 1720 | 11.86 | 1297 | 8.94 | 23.1 | 0.16 |
| K6 | 66.7 | 28.9 | 14.8 | 1471 | 10.14 | 990 | 6.83 | 7.7 | 0.05 |
| K7 | 77.8 | 28.9 | 14.8 | 1251 | 8.63 | 621 | 4.28 | 3.9 | 0.03 |
| K8 | 88.9 | 28.9 | 14.8 | 763 | 5.26 | 306 | 2.11 | 1.8 | 0.01 |
| K9 | 100 | 28.9 | 14.8 | 387 | 2.67 | 200 | 1.38 | 1.3 | 0.01 |
| L6 | 66.7 | 33.1 | 16.4 | 1133 | 7.81 | 613 | 4.23 | | |
| L7 | 77.8 | 33.1 | 16.4 | 704 | 4.85 | 293 | 2.02 | | |
| L8 | 88.9 | 33.1 | 16.4 | 573 | 3.95 | 187 | 1.29 | | |
| L9 | 100 | 33.1 | 16.4 | 91 | 0.63 | 96 | 0.66 | | |
| M6 | 66.7 | 25.6 | 17 | 996 | 6.87 | 597 | 4.12 | 4.2 | 0.03 |
| M7 | 77.8 | 25.6 | 17 | 698 | 4.81 | 298 | 2.05 | 1.8 | 0.01 |
| M8 | 88.9 | 25.6 | 17 | 336 | 2.32 | 185 | 1.28 | 1.0 | 0.01 |
| M9 | 100 | 25.6 | 17 | 129 | 0.89 | 135 | 0.93 | 0.8 | 0.01 |
| N8 | 88.9 | 34.5 | 11.1 | 1506 | 10.38 | 851 | 5.87 | | |
| N9 | 100 | 34.5 | 11.1 | 1412 | 9.74 | 675 | 4.65 | | |
| P8 | 88.9 | 16.4 | 10.8 | 1405 | 9.69 | 805 | 5.55 | 7.4 | 0.05 |
| P9 | 100 | 16.4 | 10.8 | 1268 | 8.74 | 641 | 4.42 | 5.7 | 0.04 |

In this example blends of a First Polymeric Component, Escorene 4292, a homoisotactic polypropylene available from Exxon Chemical Co., Houston Tex. and one Second Polymeric component (identified as SPC1 in Table 4) were made using the procedure as described above The blends were made in a different composition range as shown by the table above. All of the compositions are within have the properties of this invention. Properties of the blend were measured as molded.

Example 5

TABLE 5

Flexural Modulus, Tensile Modulus and Tension set for Binary Blends of one FPC and two SPC as molded

| Sample | Wt % SPC1 | ML of SPC1 | C2 Wt. % of SPC1 | Wt. % SPC2 | 500% Modulus (psi) | 500% Modulus (MPa) | 100% Modulus (psi) | 100% Modulus (Mpa) | Flexural modulus (kpsi in/in) | (MPa cm/cm) |
|---|---|---|---|---|---|---|---|---|---|---|
| AA4 | 44.4 | 31.2 | 13.4 | 27.8 | 1833 | 12.64 | 1096 | 7.56 | 16.6 | 0.11 |
| AA5 | 55.6 | 31.2 | 13.4 | 22.2 | 1571 | 10.83 | 909 | 6.27 | 11.3 | 0.08 |
| AA6 | 66.7 | 31.2 | 13.4 | 16.7 | 1342 | 9.25 | 748 | 5.16 | 7.9 | 0.05 |
| AA7 | 77.8 | 31.2 | 13.4 | 11.1 | 1077 | 7.43 | 524 | 3.61 | 4.7 | 0.03 |
| AA8 | 88.9 | 31.2 | 13.4 | 5.56 | 872 | 6.01 | 385 | 2.65 | 3.4 | 0.02 |
| AA9 | 100 | 31.2 | 13.4 | 0 | 751 | 5.18 | 320 | 2.21 | | |
| BB4 | 44.4 | 38.4 | 14.7 | 27.8 | 1791 | 12.35 | 1154 | 7.96 | 17.4 | 0.12 |
| BB5 | 55.6 | 38.4 | 14.7 | 22.2 | 1543 | 10.64 | 798 | 5.50 | 13.8 | 0.10 |
| BB6 | 66.7 | 38.4 | 14.7 | 16.7 | 1187 | 8.18 | 548 | 3.78 | 4.8 | 0.03 |
| BB7 | 77.8 | 38.4 | 14.7 | 11.1 | 920 | 6.34 | 379 | 2.61 | 2.9 | 0.02 |
| BB8 | 88.9 | 38.4 | 14.7 | 5.56 | 697 | 4.81 | 386 | 2.66 | 1.9 | 0.01 |
| BB9 | 100 | 38.4 | 14.7 | 0 | 387 | 2.67 | 200 | 1.38 | | |
| CC5 | 55.6 | 24.9 | 12.1 | 22.2 | 1619 | 11.16 | 970 | 6.69 | 17.4 | 0.12 |
| CC6 | 66.7 | 24.9 | 12.1 | 16.7 | 1504 | 10.37 | 849 | 5.85 | 12.1 | 0.08 |
| CC7 | 77.8 | 24.9 | 12.1 | 11.1 | 1296 | 8.94 | 690 | 4.76 | 8.7 | 0.06 |
| CC8 | 88.9 | 24.9 | 12.1 | 5.56 | 1152 | 7.94 | 581 | 4.01 | 5.8 | 0.04 |
| CC9 | 100 | 24.9 | 12.1 | 0 | 1051 | 7.25 | 481 | 3.32 | 4.6 | 0.03 |
| EE5 | 55.6 | 31.2 | 13.4 | 13.32 | 2019 | 13.92 | 1303 | 8.98 | | |
| EE6 | 66.7 | 31.2 | 13.4 | 10.02 | 1581 | 10.90 | 878 | 6.05 | | |
| EE7 | 77.8 | 31.2 | 13.4 | 6.66 | 1398 | 9.64 | 643 | 4.43 | | |
| EE8 | 88.9 | 31.2 | 13.4 | 3.33 | 1064 | 7.34 | 457 | 3.15 | | |
| EE9 | 100 | 31.2 | 13.4 | 0 | 871 | 6.01 | 381 | 2.63 | | |
| FF5 | 55.6 | 38.4 | 14.7 | 13.32 | 1830 | 12.62 | 1214 | 8.37 | 22.0 | 0.15 |

TABLE 5-continued

Flexural Modulus, Tensile Modulus and Tension set for Binary Blends of one FPC and two SPC as molded

| Sample | Wt % SPC1 | ML of SPC1 | C2 Wt. % of SPC1 | Wt. % SPC2 | 500% Modulus (psi) | (MPa) | 100% Modulus (psi) | (Mpa) | Flexural modulus (kpsi in/in) | (MPa cm/cm) |
|---|---|---|---|---|---|---|---|---|---|---|
| FF6 | 66.7 | 38.4 | 14.7 | 10.02 | 1612 | 11.11 | 847 | 5.84 | 8.4 | 0.06 |
| FF7 | 77.8 | 38.4 | 14.7 | 6.66 | 1168 | 8.05 | 470 | 3.24 | 4.1 | 0.03 |
| FF8 | 88.9 | 38.4 | 14.7 | 3.33 | 921 | 6.35 | 369 | 2.54 | 2.5 | 0.02 |
| FF9 | 100 | 38.4 | 14.7 | 0 | 579 | 3.99 | 264 | 1.82 | 2.0 | 0.01 |
| DD4 | 44.4 | 23.4 | 16.8 | 27.8 | 1640 | 11.31 | 1053 | 7.26 | 13.2 | 0.09 |
| DD5 | 55.6 | 23.4 | 16.8 | 22.2 | 1424 | 9.82 | 708 | 4.88 | 6.2 | 0.04 |
| DD6 | 66.7 | 23.4 | 16.8 | 16.7 | 1178 | 8.12 | 437 | 3.01 | 2.5 | 0.02 |
| DD7 | 77.8 | 23.4 | 16.8 | 11.1 | 849 | 5.85 | 270 | 1.86 | 1.4 | 0.01 |
| DD8 | 88.9 | 23.4 | 16.1 | 5.56 | 535 | 3.69 | 199 | 1.37 | 1.1 | 0.01 |
| DD9 | 100 | 23.4 | 16.1 | 0 | 318 | 2.19 | 135 | 0.93 | | |
| GG6 | 66.7 | 24.9 | 12.1 | 10.02 | 1751 | 12.07 | 975 | 6.72 | | |
| GG7 | 77.8 | 24.9 | 12.1 | 6.66 | 1563 | 10.78 | 798 | 5.50 | | |
| GG8 | 88.9 | 24.9 | 12.1 | 3.33 | 1279 | 8.82 | 624 | 4.30 | | |
| GG9 | 100 | 24.9 | 12.1 | 0 | 1129 | 7.78 | 552 | 3.81 | | |
| HH5 | 55.6 | 23.4 | 16.8 | 13.32 | 1385 | 9.55 | 964 | 6.65 | 13.1 | 0.09 |
| HH6 | 66.7 | 23.4 | 16.8 | 10.02 | 1005 | 6.93 | 501 | 3.45 | 4.0 | 0.03 |
| HH7 | 77.8 | 23.4 | 16.8 | 6.66 | 531 | 3.66 | 251 | 1.73 | 1.9 | 0.01 |
| HH8 | 88.9 | 23.4 | 16.8 | 3.33 | 318 | 2.19 | 184 | 1.27 | 1.1 | 0.01 |
| HH9 | 100 | 23.4 | 16.8 | 0 | 129 | 0.89 | 135 | 0.93 | | |
| JJ6 | 66.7 | 31.2 | 13.4 | 3.33 | 1569 | 10.82 | 889 | 6.13 | | |
| JJ7 | 77.8 | 31.2 | 13.4 | 2.22 | 1303 | 8.98 | 603 | 4.16 | | |
| JJ8 | 88.9 | 31.2 | 13.4 | 1.11 | 1007 | 6.94 | 417 | 2.88 | | |
| JJ9 | 100 | 31.2 | 13.4 | 0 | 753 | 5.19 | 320 | 2.21 | | |
| KK5 | 55.6 | 38.4 | 14.7 | 4.44 | 1943 | 13.40 | 1316 | 9.07 | | |
| KK6 | 66.7 | 38.4 | 14.7 | 3.33 | 1666 | 11.49 | 871 | 6.01 | | |
| KK7 | 77.8 | 38.4 | 14.7 | 2.22 | 1295 | 8.93 | 507 | 3.50 | | |
| KK8 | 88.9 | 38.4 | 14.7 | 1.11 | 976 | 6.73 | 383 | 2.64 | | |
| KK9 | 100 | 38.4 | 14.7 | 0 | 387 | 2.67 | 200 | 1.38 | | |
| LL6 | 66.7 | 24.9 | 12.1 | 3.33 | 1944 | 13.40 | 1121 | 7.73 | | |
| LL7 | 77.8 | 24.9 | 12.1 | 2.22 | 1599 | 11.02 | 854 | 5.89 | | |
| LL8 | 88.9 | 24.9 | 12.1 | 1.11 | 1259 | 8.68 | 638 | 4.40 | | |
| LL9 | 100 | 24.9 | 12.1 | 0 | 1127 | 7.77 | 552 | 3.81 | | |

In this example blends of a First Polymeric Component, Escorene 4292, a homoisotactic polypropylene available from Exxon Chemical Co. Houston Tex. and two Second Polymeric component (identified as SPC1 and SPC2 in Table 5) were made using the procedure as described above. The SPC2 has a ML(1+4)@125 of 14 and an ethylene content of 7.3 wt. %. The composition and the ML of the SPC1 are indicated in the Table for the various SPC1 used. The blends were made in a different composition range as shown by the table above. All of the compositions are within have the properties of this invention. Properties of the blend were measured as molded.

Example 6

TABLE 6

Hysteresis and Tension set for Binary Blends of one FPC and one SPC and Ternary Blend of one FPC and two SPC described in Table 4 and 5 as (1) new, (2) after annealing at room temperature for 21 days and (3) after momentary orientation to 200%.

| Sample | 200% Hysterisis Set | | | Tension Set % | | |
|---|---|---|---|---|---|---|
| | New | Annealed | Oriented | New | Annealed | Oriented |
| F6 | 55 | 56 | 31 | 28 | 27 | 6 |
| F7 | 35 | 29 | 16 | 19 | 16 | 6 |
| F8 | 20 | 24 | 15 | 16 | 9 | 6 |
| F9 | 18 | 16 | 6 | 9 | 3 | 3 |
| H6 | 65 | 64 | 31 | 34 | 31 | 13 |
| H7 | 38 | 36 | 16 | 19 | 19 | 6 |
| H8 | 33 | 25 | 16 | 16 | 13 | 3 |
| H9 | 21 | 21 | 13 | 14 | 6 | 2 |
| M5 | 91 | 71 | 54 | 42 | 31 | 16 |
| M6 | 65 | 48 | 41 | 25 | 9 | 9 |
| M7 | 38 | 28 | 29 | 9 | 6 | 3 |
| M8 | 33 | 24 | 23 | 6 | 3 | 3 |
| M9 | 32 | 19 | 20 | 9 | 3 | 2 |
| N8 | 52 | 13 | 13 | 31 | 6 | 6 |
| N9 | 57 | 33 | 32 | 38 | 16 | 19 |
| P7 | 57 | 54 | 57 | 38 | 27 | 13 |
| P8 | 39 | 34 | 34 | 25 | 22 | 10 |
| P9 | 33 | 23 | 23 | 25 | 16 | 6 |
| G6 | 60 | 56 | 31 | 28 | 25 | 13 |
| G7 | 33 | 31 | 16 | 19 | 16 | 6 |
| G8 | 24 | 28 | 8 | 13 | 9 | 3 |
| G9 | 12 | 13 | 6 | 8 | 9 | 3 |
| J6 | 47 | 21 | 21 | 19 | 9 | 9 |
| J7 | 31 | 24 | 16 | 13 | 11 | 6 |
| J8 | 18 | 13 | 7 | 13 | 9 | 6 |
| J9 | 15 | 9 | 3 | 6 | 6 | 2 |
| K5 | 71 | 79 | 48 | 34 | 41 | 16 |
| K6 | 48 | 33 | 25 | 52 | 16 | 9 |
| K7 | 19 | 15 | 11 | 9 | 9 | 2 |
| K8 | 14 | 13 | 1 | 6 | 6 | 0 |

TABLE 6-continued

Hysteresis and Tension set for Binary Blends of one FPC and one SPC and Ternary Blend of one FPC and two SPC described in Table 4 and 5 as (1) new, (2) after annealing at room temperature for 21 days and (3) after momentary orientation to 200%.

| | 200% Hysterisis Set | | | Tension Set % | | |
|---|---|---|---|---|---|---|
| Sample | New | Annealed | Oriented | New | Annealed | Oriented |
| K9 | 16 | 8 | 6 | 5 | 3 | 0 |
| L6 | 60 | 35 | 21 | 25 | 13 | 8 |
| L7 | 39 | 20 | 14 | 9 | 3 | 5 |
| L8 | 31 | 15 | 5 | 8 | 8 | 3 |
| L9 | 31 | 31 | 9 | 9 | 0 | 3 |
| AA4 | 65 | 54 | 43 | 33 | 28 | 14 |
| AA5 | 40 | 39 | 20 | 25 | 19 | 8 |
| AA6 | 27 | 31 | 16 | 22 | 16 | 5 |
| AA7 | 19 | 19 | 11 | 16 | 13 | 5 |
| AA8 | 17 | 14 | 13 | 13 | 9 | 2 |
| BB4 | 53 | 56 | 35 | 28 | 28 | 9 |
| BB5 | 37 | 36 | 19 | 19 | 19 | 6 |
| BB6 | 23 | 15 | 16 | 14 | 9 | 6 |
| BB7 | 14 | 20 | 5 | 11 | 6 | 5 |
| BB8 | 14 | 18 | 10 | 9 | 6 | 3 |
| CC5 | 58 | 49 | 30 | 34 | 25 | 16 |
| CC6 | 43 | 41 | 20 | 22 | 16 | 8 |
| CC7 | 29 | 24 | 15 | 19 | 13 | 6 |
| CC8 | 28 | 20 | 11 | 17 | 9 | 6 |
| EE5 | 60 | 56 | 60 | 31 | 42 | 11 |
| EE6 | 35 | 26 | 35 | 17 | 14 | 6 |
| EE7 | 21 | 14 | 21 | 13 | 9 | 5 |
| EE8 | 16 | 14 | 16 | 9 | 6 | 2 |
| FF4 | 88 | 81 | 64 | 50 | 38 | 25 |
| FF5 | 52 | 48 | 31 | 30 | 23 | 13 |
| FF6 | 23 | 23 | 15 | 13 | 9 | 6 |
| FF7 | 19 | 11 | 5 | 9 | 6 | 3 |
| FF8 | 9 | 8 | 5 | 6 | 3 | 2 |
| DD4 | 65 | 56 | 39 | 31 | 23 | 6 |
| DD5 | 34 | 34 | 26 | 16 | 25 | 6 |
| DD6 | 28 | 23 | 20 | 11 | 17 | 3 |
| DD7 | 24 | 23 | 20 | 9 | 13 | 3 |
| DD8 | 28 | 24 | 15 | 6 | 9 | 0 |
| GG6 | 43 | 43 | 43 | 25 | 25 | 9 |
| GG7 | 28 | 28 | 28 | 19 | 16 | 9 |
| GG8 | 22 | 22 | 22 | 16 | 13 | 6 |
| HH4 | 79 | 79 | 54 | 45 | 41 | 19 |
| HH5 | 64 | 64 | 39 | 34 | 28 | 11 |
| HH6 | 38 | 34 | 26 | 16 | 11 | 5 |
| HH7 | 28 | 30 | 21 | 9 | 6 | 2 |
| HH8 | 26 | 25 | 15 | 6 | 3 | 0 |
| JJ5 | 73 | 73 | 73 | 41 | 38 | 19 |
| JJ6 | 35 | 35 | 35 | 19 | 16 | 8 |
| JJ7 | 17 | 17 | 17 | 13 | 9 | 5 |
| JJ8 | 13 | 13 | 13 | 9 | 6 | 5 |
| KK5 | 56 | 64 | 39 | 31 | 28 | 11 |
| KK6 | 30 | 26 | 19 | 17 | 13 | 5 |
| KK7 | 18 | 11 | 9 | 9 | 6 | 2 |
| KK8 | 11 | 12 | 6 | 9 | 6 | 2 |
| LL6 | 60 | 60 | 60 | 34 | 31 | 13 |
| LL7 | 32 | 32 | 32 | 19 | 16 | 8 |
| LL8 | 26 | 26 | 26 | 16 | 13 | 6 |

Example 7

Blends were made in all composition of Table 7 according to the procedure described above.

TABLE 7

Blends where the FPC is a reactor copolymer and the SPC are described below

| | Wt % | Wt % | 500% Modulus | | 100% Modulus | |
|---|---|---|---|---|---|---|
| Sample | SPC1 | FPC | (psi) | (MPa) | (psi) | (MPa) |
| 2AA1 | 44.4 | 44.4 | | | | |
| 2AA2 | 38.8 | 38.8 | | | | |
| 2AA3 | 33.3 | 33.3 | | | | |
| 2AA4 | 27.8 | 27.8 | 1302 | 8.98 | 919 | 6.34 |
| 2AA5 | 22.2 | 22.2 | 1194 | 8.23 | 794 | 5.47 |
| 2AA6 | 16.7 | 16.7 | 1013 | 6.98 | 604 | 4.16 |
| 2AA7 | 11.1 | 11.1 | 857 | 5.91 | 486 | 3.35 |
| 2AA8 | 5.55 | 5.55 | 690 | 4.76 | 353 | 2.43 |
| 2BB1 | 27 | 62 | | | | |
| 2BB2 | 23 | 54 | | | | |
| 2BB3 | 20 | 47 | | | | |
| 2BB4 | 17 | 39 | 1311 | 9.04 | 994 | 6.85 |
| 2BB5 | 13 | 31 | 125 | 0.86 | 821 | 5.66 |
| 2BB6 | 10 | 23 | 1006 | 6.94 | 591 | 4.07 |
| 2BB7 | 7 | 16 | 823 | 5.67 | 438 | 3.02 |
| 2BB8 | 3 | 8 | 657 | 4.53 | 338 | 2.33 |

In this example blends of a First Polymeric Component, Escorene 9272, a reactor copolymer available from Exxon Chemical Co., Houston Tex. having an ethylene content of 5 wt % and 2.9 MFR and two Second Polymeric component (identified as SPC1 and SPC2 in Table 7) were made using the procedure as described above. The SPC1 has a ML(1+4)@125 of 11 and an ethylene content of 14.5 wt %. The SPC2 has a ML(1+4)@125 of 21 and an ethylene content of 5.8 wt %. The blends were made in a different composition range as shown by the table above. All of the compositions are within have the properties of this invention. Properties of the blend were measured as molded.

Example 8

TABLE 8

Hysteresis and Tension set for Binary Blends of one FPC and one SPC and Ternary Blend of one FPC and two SPC described in Table 7 as (1) new, (2) after annealing at room temperature for 21 days and (3) after momentary orientation to 200%.

| | 200% Hysterisis Set | | | Tension Set % | | |
|---|---|---|---|---|---|---|
| Sample | New | Annealed | Oriented | New | Annealed | Oriented |
| 2AA4 | 63 | 63 | 33 | 29 | 37 | 6 |
| 2AA5 | 39 | 39 | 28 | 20 | 22 | 9. |
| 2AA6 | 31 | 29 | 15 | 17 | 16 | 3 |
| 2AA7 | 26 | 26 | 11 | 11 | 12 | 3 |
| 2AA8 | 18 | 15 | 9 | 8 | 9 | 3 |
| 2BB4 | 63 | 71 | 39 | 40 | 34 | 18 |
| 2BB5 | 44 | 43 | 28 | 37 | 19 | 12. |
| 2BB6 | 26 | 31 | 15 | 12 | 12. | 4 |
| 2BB7 | 19 | 20 | 11 | 9 | 11 | 3 |
| 2BB8 | 18 | 18 | 10 | 9 | 11 | 3 |

Example 9

Blends were made in all composition of Table 7 according to the procedure described above.

TABLE 9

Blends where the FPC is a reactor copolymer and the SPC are described below

| Sample | Wt % SPC1 | Wt % FPC | 500% Modulus (psi) | (MPa) | 100% Modulus (psi) | (MPa) |
|---|---|---|---|---|---|---|
| 2CC1 | 44.4 | 44.4 | | | | |
| 2CC2 | 38.8 | 38.8 | | | | |
| 2CC3 | 33.3 | 33.3 | | | | |
| 2CC4 | 27.8 | 27.8 | 1524 | 10.51 | 1082 | 7.46 |
| 2CC5 | 22.2 | 22.2 | 1261 | 8.69 | 733 | 5.05 |
| 2CC6 | 16.7 | 16.7 | 1119 | 7.72 | 581 | 4.01 |
| 2CC7 | 11.1 | 11.1 | 854 | 5.89 | 411 | 2.83 |
| 2CC8 | 5.55 | 5.55 | 656 | 4.52 | 304 | 2.10 |
| 2DD1 | 27 | 62 | | | | |
| 2DD2 | 23 | 54 | | | | |
| 2DD3 | 20 | 47 | | | | |
| 2DD4 | 17 | 39 | 1647 | 11.36 | 1314 | 9.06 |
| 2DD5 | 13 | 31 | 1452 | 10.01 | 834 | 5.75 |
| 2DD6 | 10 | 23 | 1196 | 8.25 | 610 | 4.21 |
| 2DD7 | 7 | 16 | 885 | 6.10 | 388 | 2.68 |
| 2DD8 | 3 | 8 | 670 | 4.62 | 283 | 1.95 |

In this example blends of a First Polymeric Component, Escorene 7132, a impact copolymer available from Exxon Chemical Co., Houston Tex. having an ethylene content of 9 wt % and 2.0 MFR and two Second Polymeric component (identified as SPC1 and SPC2 in. Table 7) were made using the procedure as described above. The SPC1 has a ML(1+4)@125 of 11 and an ethylene content of 14.5 wt %. The SPC2 has a ML(1+4)@125 of 21 and an ethylene content of 5.8 wt %. The blends were made in a different composition range as shown by the table above. All of the compositions are within have the properties of this invention. Properties of the blend were measured as molded.

Example 10

TABLE 10

Hysteresis and Tension set for Binary Blends of one FPC and one SPC and Ternary Blend of one FPC and two SPC described in Table 9 as (1) new, (2) after annealing at room temperature for 21 days and (3) after momentary orientation to 200%.

| | 200% Hysterisis Set | | | Tension Set % | | |
|---|---|---|---|---|---|---|
| Sample | New | Annealed | Oriented | New | Annealed | Oriented |
| 2CC4 | 66 | 77 | 39 | 37.5 | 34.375 | 14.0625 |
| 2CC5 | 44 | 41 | 28 | 23.4375 | 18.75 | 4.6875 |
| 2CC6 | 25 | 31 | 16 | 10.9375 | 9.375 | 3.125 |
| 2CC7 | 18 | 18 | 10 | 10.9375 | 9.375 | 3.125 |
| 2CC8 | 19 | 19 | 11 | 9.375 | 7.8125 | 1.5625 |
| 2DD4 | 89 | 89 | 58 | 53.125 | 34.375 | 25 |
| 2DD5 | 44 | 40 | 26 | 20.3125 | 18.75 | 6.25 |
| 2DD6 | 31 | 28 | 16 | 10.9375 | 10.9375 | 4.6875 |
| 2DD7 | 18 | 19 | 9 | 7.8125 | 7.8125 | 3.125 |
| 2DD8 | 21 | 19 | 11 | 4.6875 | 6.25 | 3.125 |

Example 11

Blends were made in all composition of Table 1 according to the procedure described above.

TABLE 11

Blends where the FPC is an isotactic homopolymer, a process oil and the SPC are described below

| Sample | Wt % SPC1 | Wt % FPC | Wt % Sunpar 150 | 500% Modulus (psi) | (MPa) | 100% Modulus (psi) | (MPa) |
|---|---|---|---|---|---|---|---|
| 2EE1 | 36 | 36 | 20 | | | | |
| 2EE2 | 31 | 31 | 20 | 1355 | 9.34 | 1130 | 7.79 |
| 2EE3 | 27 | 27 | 20 | 1248 | 8.60 | 945 | 6.52 |
| 2EE4 | 22 | 22 | 20 | 1119 | 7.72 | 749 | 5.16 |
| 2EE5 | 18 | 18 | 20 | 902 | 6.22 | 532 | 3.67 |
| 2EE6 | 13 | 13 | 20 | 690 | 4.76 | 336 | 2.32 |
| 2EE7 | 9 | 9 | 20 | 576 | 3.97 | 274 | 1.89 |
| 2EE8 | 4 | 4 | 20 | 386 | 2.66 | 176 | 1.21 |
| 2EE9 | 0 | 0 | 20 | 221 | 1.52 | 121 | 0.83 |
| 2FF1 | 21 | 50 | 20 | | | | |
| 2FF2 | 19 | 44 | 20 | 1552 | 10.70 | 1313 | 9.05 |
| 2FF3 | 16 | 37 | 20 | 1442 | 9.94 | 1113 | 7.67 |
| 2FF4 | 13 | 31 | 20 | 1264 | 8.71 | 831 | 5.73 |
| 2FF5 | 11 | 25 | 20 | 1025 | 7.07 | 569 | 3.92 |
| 2FF6 | 8 | 19 | 20 | 798 | 5.50 | 387 | 2.67 |
| 2FF7 | 5 | 12 | 20 | 605 | 4.17 | 269 | 1.85 |
| 2FF8 | 3 | 6 | 20 | 406 | 2.80 | 176 | 1.21 |

In this example blends of a First Polymeric Component, Escorene 4292, a isotactic homopolymer available from Exxon Chemical Co., Houston Tex. having 0.9 MFR and two Second Polymeric component (identified as SPC1 and SPC2 in Table 7) were made using the procedure as described above. The SPC1 has a ML(1+4)@125 of 11 and an ethylene content of 14.5 wt %. The SPC2 has a ML(1+4)@125 of 21 and an ethylene content of 5.8 wt %. Sunpar 150 is a process oil available from Sun Refining Company. The blends were made in a different composition range as shown by the table above. All of the compositions are within have the properties of this invention. Properties of the blend were measured as molded.

Example 12

TABLE 12

Hysteresis and Tension set for Ternary Blend of one FPC and two SPC and a process oil described in Table 11 as (1) new, (2) after annealing at room temperature for 21 days and (3) after momentary orientation to 200%.

| | 200% Hysterisis Set | | | Tension Set % | | |
|---|---|---|---|---|---|---|
| Sample | New | Annealed | Oriented | New | Annealed | Oriented |
| EE3 | 58 | 58 | 43 | 31.25 | 28.125 | 10.9375 |
| EE4 | 43 | 46 | 31 | 21.875 | 21.875 | 7.8125 |
| EE5 | 36 | 36 | 21 | 15.625 | 17.1875 | 4.6875 |
| EE6 | 25 | 26 | 15 | 10.9375 | 12.5 | 4.6875 |
| EE7 | 18 | 19 | 11 | 7.8125 | 10.9375 | 4.6875 |
| EE8 | 16 | 18 | 9 | 4.6875 | 7.8125 | 3.125 |
| EE9 | 11 | 13 | 14 | 1.5625 | 4.6875 | 0 |
| FF3 | 76 | 76 | 53 | 39.0625 | 37.5 | 15.625 |
| FF4 | 58 | 53 | 36 | 28.125 | 26.5625 | 7.8125 |
| FF5 | 38 | 38 | 29 | 15.625 | 17.1875 | 7.8125 |
| FF6 | 29 | 24 | 21 | 10.9375 | 10.9375 | 6.25 |
| FF7 | 20 | 19 | 11 | 7.8125 | 7.8125 | 3.125 |
| FF8 | 16 | 18 | 11 | 6.25 | 6.25 | 3.125 |

Example 12

Comparative Blends

Comparative blends of compositions similar to those of the blends of the inventive composition were made with EPR and aePP as shown in Table 1. In all cases the blends had a tensile elongation less than 500% and are not reported in either the FIGS. 6, 7 and 8.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention claimed is:

1. A blend comprising at least one polymer (A) and at least one polymer (B), polymer (A) comprising about 60 wt % to about 98 wt % of the blend, and polymer (A) comprising from about 65 wt % to about 95 wt % of units derived from propylene and having units derived from ethylene and/or $C_6$–$C_{20}$ α-olefin, and polymer (A) is further characterized as comprising crystallizable propylene sequences, and polymer (B) comprises a predominantly crystalline propylene polymer.

2. The blend of claim 1, wherein the α-olefin is hexene.

3. The blend of claim 1, wherein the α-olefin is octene.

4. The blend of claim 1, wherein polymer (A) has a Mooney viscosity (ML 1+4@125° C.) less than 100.

5. The blend of claim 4, wherein polymer (A) has a Mooney viscosity less than about 60.

6. The blend of claim 5, wherein polymer (A) has a Mooney viscosity from about 14 to about 60.

7. The blend of claim 1, wherein polymer (A) has a heat of fusion less than about 75 J/g.

8. The blend of claim 1, wherein polymer (A) is prepared using a catalyst comprising a hafnium-based composition.

9. The blend of claim 8, wherein polymer (A) is prepared using a catalyst activator comprising boron, fluorine, and/or aluminum.

10. The blend of claim 1, wherein polymer (A) has a polydispersity index from about 1.5 to about 5.

11. The blend of claim 10, wherein the polydispersity index is from about 2.1 to about 2.6.

12. The blend of claim 1, wherein polymer (A) is a terpolymer.

13. The blend of claim 1, further comprising a process oil.

14. The blend of claim 1, further comprising one or more additives.

15. The blend composition of claim 1, wherein polymer (A) comprises from 65 wt % to about 95 wt % propylene-derived units and the balance comprises units derived from ethylene and/or $C_6$–$C_{20}$ α-olefin.

16. An article of manufacture made from a polymer blend comprising at least one polymer (A) and at least one polymer (B), polymer (A) comprising about 60 wt % to about 98 wt % of the blend, and polymer (A) comprising from about 65 wt % to about 95 wt % of units derived from propylene and having units derived from ethylene and/or $C_6$–$C_{20}$ α-olefin, and polymer (A) is further characterized as comprising crystallizable propylene sequences, and polymer (B) comprises a predominantly crystalline propylene polymer.

17. The article of claim 16, wherein the α-olefin is hexene.

18. The article of claim 16, wherein the α-olefin is octene.

19. The article of claim 16, wherein polymer (A) has a Mooney viscosity (ML 1+4@125° C.) less than 100.

20. The article of claim 19, wherein polymer (A) has a Mooney viscosity from about 14 to about 60.

21. A blend comprising at least one polymer (A) and at least one polymer (B), polymer (A) comprising about 60 wt % to about 98 wt % of the blend, and polymer (A) comprising from about 65 wt % to about 95 wt % of units derived from propylene and having units derived from ethylene and/or $C_6$–$C_{20}$ α-olefin, and polymer (A) is further characterized as comprising crystallizable propylene sequences, and polymer (B) comprises a substantially isotactic thermoplastic polymer other than polymer (A), wherein polymer (A):

a. is prepared using a catalyst comprising a hafnium-based composition;

b. has a Mooney viscosity (ML 1+4@125° C.) less than about 60;

c. has a polydispersity index from about 1.8 to about 5; and d. has a heat of fusion less than about 75 J/g.

22. The blend of claim 21, wherein the α-olefin is hexene.

23. The blend of claim 21, wherein the α-olefin is octene.

24. The blend of claim 21, wherein polymer (A) is prepared using a catalyst activator comprising boron, fluorine, and/or aluminum.

25. A blend comprising at least one polymer (A) and at least one polymer (B), polymer (A) comprising about 60 wt % to about 98 wt % of the blend, and polymer (A) comprising from about 65 wt % to about 95 wt % of units derived from propylene and having units derived from ethylene and/or $C_6$–$C_{20}$ α-olefin, and polymer (A) has a heat of fusion <75 J/g and a Mooney viscosity (ML 1+4@125° C.) less than 100, and polymer (B) comprises a predominantly crystalline polymer.

26. The blend of claim 25, wherein polymer (A) comprises from 65 wt % to about 95 wt % propylene-derived units and the balance comprises units derived from ethylene and/or $C_6$–$C_{20}$ α-olefin.

27. The blend of claim 25, wherein the α-olefin is hexene.

28. The blend of claim 25, wherein the α-olefin is octene.

29. The blend of claim 25, wherein polymer (A) has a Mooney viscosity less than about 60.

30. The blend of claim 29, wherein polymer (A) has a Mooney viscosity from about 14 to about 60.

31. The blend of claim 25, wherein polymer (A) is prepared using a catalyst comprising a hafnium-based composition.

32. The blend of claim 31, wherein polymer (A) is prepared using a catalyst activator comprising boron, fluorine, and/or aluminum.

33. The blend of claim 25, wherein polymer (A) has a polydispersity index from about 1.5 to about 5.

34. The blend of claim 33, wherein the polydispersity index is from about 2.1 to about 2.6.

35. The blend of claim 25, wherein polymer (A) is a terpolymer.

36. The blend of claim 25, further comprising a process oil.

37. The blend of claim 25, further comprising one or more additives.

38. A blend comprising at least one polymer (A) and at least one polymer (B), polymer (A) comprising about 60 wt % to about 98 wt % of the blend, and wherein polymer (A) comprises from about 65 wt % to about 95 wt % of units derived from propylene and the balance units derived from ethylene and/or a $C_6$–$C_{20}$ α-olefin, and polymer (A) is further characterized as comprising crystallizable propylene sequences, and polymer (B) comprises a substantially isotactic polypropylene, wherein polymer (A):

a. has a Mooney viscosity (ML 1+4@125° C.) less than about 60;

b. has a polydispersity index from about 1.8 to about 5; and c. has a heat of fusion less than about 75 J/g.

39. The blend of claim 38, wherein polymer (A) is prepared using a catalyst comprising a hafnium-based composition.

40. The blend of claim 39, wherein polymer (A) is prepared using a catalyst activator comprising boron, fluorine, and/or aluminum.

* * * * *